United States Patent
Zalevsky et al.

(10) Patent No.: US 8,098,949 B2
(45) Date of Patent: Jan. 17, 2012

(54) METHOD AND SYSTEM FOR IMAGING WITH A ZOOM

(75) Inventors: Zeev Zalevsky, Rosh Haayin (IL); Alex Zlotnik, Ashdod (IL)

(73) Assignee: Xceed Imaging Ltd., Rosh Haayin (IL)

( * ) Notice: Subject to any disclaimer, the term of this patent is extended or adjusted under 35 U.S.C. 154(b) by 534 days.

(21) Appl. No.: 12/370,139

(22) Filed: Feb. 12, 2009

(65) Prior Publication Data
US 2009/0148061 A1 Jun. 11, 2009

Related U.S. Application Data

(63) Continuation of application No. PCT/IL2007/001029, filed on Aug. 16, 2007.

(60) Provisional application No. 60/837,917, filed on Aug. 16, 2006.

(51) Int. Cl.
*G06K 9/40* (2006.01)

(52) U.S. Cl. ....... 382/260; 382/274; 382/275; 358/3.26; 358/3.27

(58) Field of Classification Search .................. 382/260, 382/274, 275; 358/3.26, 3.27, 463
See application file for complete search history.

(56) References Cited

U.S. PATENT DOCUMENTS

| | | | |
|---|---|---|---|
| 4,575,193 A | 3/1986 | Greivenkamp, Jr. | |
| 4,831,463 A | 5/1989 | Faroudja | |
| 5,678,089 A | 10/1997 | Bacs, Jr. et al. | |
| 5,712,685 A * | 1/1998 | Dumas | 348/360 |
| 5,748,904 A * | 5/1998 | Huang et al. | 345/544 |
| 6,686,995 B2 | 2/2004 | Wilk et al. | |
| 7,133,148 B2 * | 11/2006 | Silverstein | 358/1.15 |
| 7,703,326 B2 * | 4/2010 | Puttmer | 73/587 |

FOREIGN PATENT DOCUMENTS
WO 2004/102958 A1 11/2004

OTHER PUBLICATIONS

International Search Report and Written Opinion, mailed Sep. 12, 2008, from International application No PCT/IL2007/001029, filed Aug. 16, 2007.
Solomon, J. et al., "Geometric superresolution by code division multiplexing," J. Appl. Optics, vol. 44, No. 1, pp. 32-40, Jan. 2005.
Zalevsky, Z. et al., "Understanding superresolution in Wigner space," J. Opt. Soc. Am., vol. 17, No. 12, pp. 2422-2430, 2000.

\* cited by examiner

*Primary Examiner* — Yosef Kassa
(74) *Attorney, Agent, or Firm* — Houston Eliseeva, LLP

(57) ABSTRACT

An imaging system and method are presented for use in imaging with zoom. The system comprises a pixel detector array (PDA), an optical focusing arrangement, and a spatial filter configured and operable to selectively switch between at least two transmitting states. Distributions of an optical resolution of the optical focusing arrangement and of a geometrical resolution of the PDA define an aliasing window along an at least one direction.

36 Claims, 22 Drawing Sheets

Degrded OTF

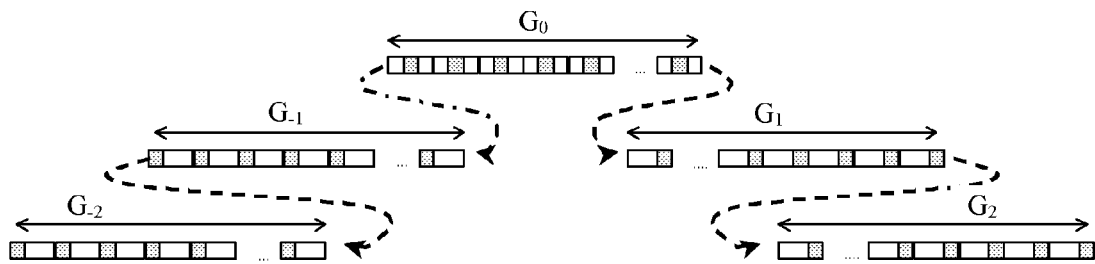
FIG. 29A
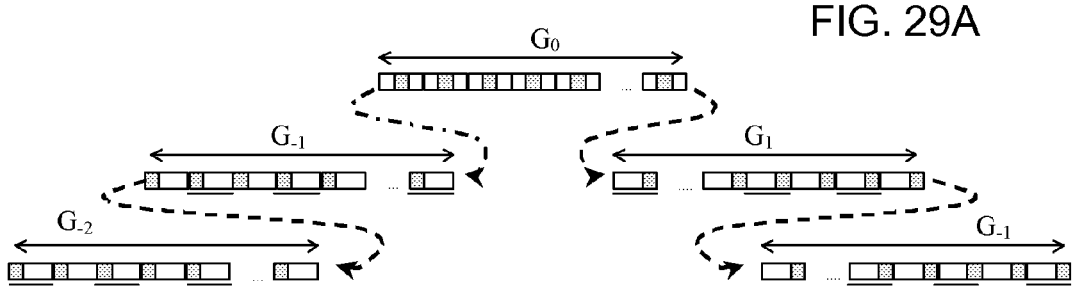
FIG. 29B
| $C_{-2}(1)$ | $C_0(1)$ | $C_2(1)$ | $C_{-1}(1)$ | $C_0(1)$ | $C_1(1)$ | $C_{-2}(2)$ | $C_0(2)$ | $C_2(2)$ | $C_{-1}(2)$ | $C_0(1)$ | $C_1(2)$ | $\cdots$ |
$\cdots$ | $C_{-2}(n)$ | $C_0(n)$ | $C_2(n)$ | $C_{-1}(n)$ | $C_0(n)$ | $C_1(n)$ |
FIG. 29C
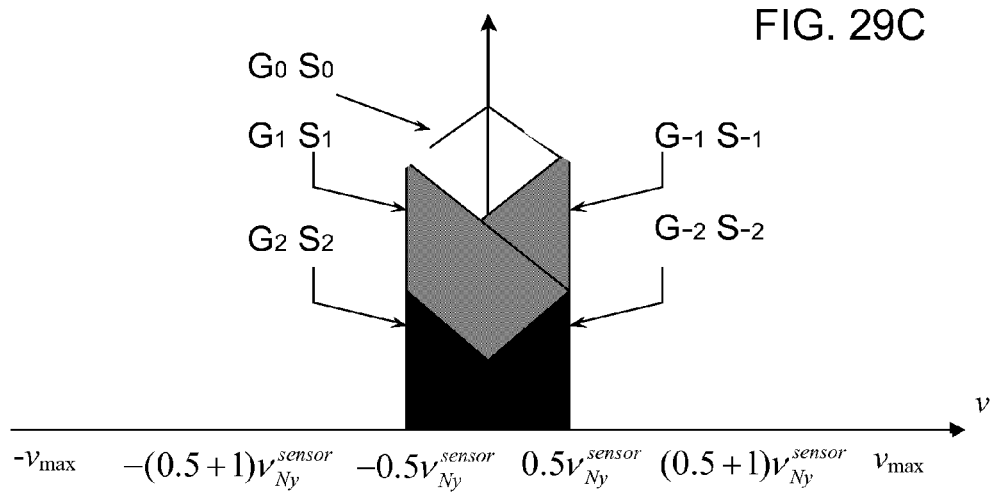
FIG. 30

METHOD AND SYSTEM FOR IMAGING WITH A ZOOM

RELATED APPLICATIONS

This application is a Continuation of PCT application serial number PCT/IL2007/001029, filed on Aug. 16, 2007, which in turn claims the benefit under 35 USC 119(e) of U.S. Provisional Application No. 60/837,917, filed on Aug. 16, 2006, both of which are incorporated herein by reference in their entirety.

FIELD OF THE INVENTION

This invention relates to a method and system for imaging with a zoom, in particular for imaging with a geometrically superresolved zoom.

BACKGROUND OF THE INVENTION

Ordinarily, in order to obtain a nominal image of a scene and also a zoomed image of the scene, a distance s between the imaging sensor and a lens of the optical system and a focal length f of the optical system have to be increased. This is evident, for example, from the thin lens magnification formulae $|M|=s/S$ and $|M|=f/S$ (for $S \gg f$); here, M is the magnification of the optical system and its absolute value needs to be increased for optical zooming and S is a distance between the lens and the scene. The zoomed image contains a smaller field of view of the scene. The field of view is reduced during the optical zooming.

In FIG. 1 there is schematically shown an exemplary optical zooming arrangement 10 including three lenses $L_1$-$L_3$, lens $L_2$ of which changes its position and therefore changes the effective focal length of the whole arrangement. While an object plane $P_O$ is to the left of the arrangement and an image plane $P_I$ is to the right of the arrangement, a shift of lens $L_2$ from the left to the right causes zooming out and a reverse movement causes zooming in. Therefore, imaging the same scene S with zooming arrangement 10 having lens $L_2$ in positions $P_1$, $P_2$ and $P_3$ results in images $I_1$, $I_2$ and $I_3$ of three different sizes. When these images are captured with a CMOS array, image $I_1$ takes its largest portion and image $I_3$ takes its smallest portion. In arrangement 10 zooming does not require lens flexing. Arrangement 10 is relatively heavy, occupies a relatively large volume, and it is of a relatively low robustness.

Generally, zooming is desired if it can provide a higher resolution. The resolution is typically limited by the worst of the diffraction-limited resolution of the optical system and the geometrical resolution of the imaging sensor. The diffraction limit is commonly defined as a minimum diameter d of spot of light formed at the focus of a lens:

$$d = 1.22 \lambda f / a \quad \text{(B1)}$$

where $\lambda$ is the wavelength of the light and a is the diameter of the lens. In other words, the diffraction limited spot is a width of a Point Spread Function (PSF). The geometrical limit is defined by a size of a photodetector pixel or by a size of a film grain.

Imaging systems, such as those capable of zooming, are frequently configured in such a way, that their smallest diffractive-limited spot exceeds or equals the geometrical resolution: this allows avoiding the effect known as aliasing. The aliasing is associated with the following: if an object scene (or its region) has a relatively energetic spatial harmonic with a spatial frequency greater than the Nyquist frequency of the imaging sensor, then capturing of this object scene is accompanied by undersampling of this harmonic. The harmonic is captured as it has a different (lower), "alias", spatial frequency. This leads to the appearance of a distortion of the object scene (or of its region) captured in the image. The aliasing effect is thus typically considered as a problem in imaging.

A typical imaging system is thus diffraction-limited: then it contains no aliasing, independently on the object scene. In fact, the optical system of the diffraction-limited imaging system filters out high-frequency content. Particularly, in case of coherent light imaging the optical system's Coherent Transfer Function (CTF) is selected such that it blocks high-frequency harmonics and in case of incoherent light imaging the optical system's Modulation Transfer Function (MTF) is selected such that it blocks high-frequency harmonics. The high-frequency harmonics of the object scene are thus not transferred to the imaging sensor. It should be understood, that the removal of high-frequency spatial harmonics leads to loss of information as is seen as blurring, however, this is typically preferred over aliasing.

Therefore, and as it has been noted above, the typical diffraction-limited imaging system is so tuned that even its smallest diffractive-limited spot exceeds or equals the geometrical resolution. This is to take into account that the diffractive-limited spot of a diffraction-limited system may vary in size: spots corresponding to different zoom levels of the optical system and different positions of the point source in the in-focus plane may or may not be the same. In many cases, the diffractive-limited spot is the smallest for the point source being on the optical axis and for the optical system providing the least zoom. While the latter is due to the broadening of the spot with zoom and can be seen from (B1), the former is due to the broadening of the spot at the edges of the lens and takes place due to aberrations.

In other words, the typical diffraction-limited imaging system is so tuned that it stays diffraction-limited for any position of a point source, as soon as the point source stays in the in-focus object plane, and for any level of the zoom. In this regard, it should be understood that not only the size of the diffraction-limited spot may vary depending on the location of the point source, but also the PSF itself (as a whole) may vary depending on this location. The diffraction-limited spot is merely a width of the PSF; when the shape of the PSF changes, the diffraction-limited spot also changes. Accordingly, the CTF and the MTF, respectively defined as Fourier transforms of the PSF and the squared PSF, may have one shape for one point source location and/or zoom level and another shape for another point source location and/or zoom level.

Though, in some imaging systems various elements are matched so as to create more or less the same blurring for various in-focus locations of the point source, i.e. for various lateral positions of the point source in the FOV at the in-focus plane or planes. The pixel pitch of the optical sensor, i.e. a distance from the center of one pixel to the center of an adjacent pixel, is selected to be as small as it is needed to avoid aliasing even at the least zoom. Further decrease of the pixel pitch may not improve the image quality; moreover, it may require more complex read-out circuitry, more complex further processing, and a smaller pixel size, which would cause more shot noise.

It should be noted, that though the aliasing generally presents a problem, there are techniques that can reduce its effect. An example of such a technique is the use of an optical birefringent filter. This is disclosed for example in U.S. Pat. No. 4,575,193

Moreover, there is a class of imaging techniques that utilize the aliasing for achieving the geometrical superresolution. Typically, these techniques are aimed at achieving superresolution for the whole image.

Generally, superresolution (SR) techniques are techniques aimed at achieving a spatial resolution better than its limiting resolution (i.e. the limiting resolution is not totally limiting). This limiting resolution is a larger of the diffraction-limited resolution of the optical system and the geometrical resolution of the optical sensor. Accordingly, the superresolution techniques are distributed between two main types: techniques aimed at improving imaging resolution beyond the diffraction limit, i.e. the optical superresolution techniques, and techniques aimed at improving the imaging resolution beyond the geometrical limit, i.e. the geometrical superresolution techniques.

Typical geometrical superresolution techniques use repetitive imaging of scene, for generating a sequence of slightly different geometrically-resolved images. One or more super-resolved images are reconstructed from the sequence. Due to a small shift/rotation or more complex motion between the different sequential images, they contain slightly different information about the scene. The shift or motion is typically sub-pixel and needs to be "registered". In order to improve the resolution n times along one direction, these methods typically need n images, and in order to increase the resolution n times along two directions, these methods need $n^2$ images. In these methods, it is assumed that the scene does not change during the imaging (scan). Therefore, the system temporal resolution is sacrificed in favor of the enhanced spatial resolution. There are techniques for improving resolution of video sequence utilizing development of object in the scene.

In this connection, it is noted that, as a rule, superresolution methods sacrifice one or more of the systems' degrees of freedom in order to improve other degrees of freedom (such as spatial resolution). This is described in the publication of Z. Zalevsky, D. Mendelovic, A. W. Lohmann "*Understanding superresolution in Wigner space*", J. Opt. Soc. Am., Vol. 17, No. 12, pp. 2422-2430, 2000, coauthored by the inventor of the present application.

The field of view presents another degree of freedom that can be sacrificed for obtaining the geometrical superresolution. This is described in the publication of J. Solomon, Z. Zalevsky and D. Mendlovich "*Geometric superresolution by code division multiplexing*", J. Appl. Optics, Vol. 44, No. 1, pp. 32-40, January, 2005, coauthored by the inventor of the present application.

In the PCT publication WO 2004/102958, assigned to the assignee of the present application, there is presented a method and system for imaging with a geometrical superresolution for at least a part of the pixel array. There, the incoming light can be aperture coded. The aperture code can be predetermined in accordance with aliasing occurring in the imaging sensor (detector) plane and selected such as to provide orthogonality of spectral data indicative of a sampled output of the imaging sensor. The aperture code thereby enables reconstruction of an image with resolution, in at least a part of the image, enhanced by a certain factor beyond the geometrical resolution.

SUMMARY OF THE INVENTION

There is a need in the art for a novel zooming technique. The technique of the present invention allows obtaining two or more levels of zoom (for each dimension). The imaging is performed through an optical focusing system and a switchable spatial filter, which may be configured as a filter of low spatial frequencies (LSF) or as a filter of space (i.e. field of view, FOV); images are focused on an image plane and can be captured by a pixel detector array (PDA), for example a CMOS or a CCD, installed in this plane. For obtaining two levels of zoom, the imaging is performed at least twice with different transmissions of the filter, respectively. These different transmission states are at times referred below as a passing state (ON-state) and a blocking state (OFF-state).

If the LSF filter is used, it is in some embodiments installed in a spectral plane of the optical focusing system. If the FOV filter is used, it is in some embodiments installed in an intermediate image plane of the optical focusing system (i.e. in an image plane located upstream of the PDA image plane with respect to the light propagation towards the PDA); and the focusing optical system is such that it has at least one intermediate image plane. If the FOV filter is used, the focusing optical system can have also a spectral plane downstream of the used intermediate image plane. An orthogonal spatial frequency (OSF) filter, described below, is to be located downstream of the FOV filter, e.g. may be installed in the respective spectral plane. The LSF filter, likewise, can be used with the OSF filter; these two filters even may be installed in the same spectral plane. As well, the LSF filter may be used with a partially orthogonal spatial frequency (POSF) filter; this filter is also described below. The FOV filter may be used with the POSF filter especially if the LSF filter is used. The switchable LSF filter may have intermediate states, while a need for them may arise and increase with a decrease in a degree of orthogonality of the respective OSF/POSF filter. In some embodiments, a distribution of the optical resolution of the optical focusing system over its field of view is non-uniform: the resolution is higher (i.e. smaller) than the geometrical resolution of the PDA in a part ("window") of the optical focusing system's field of view.

Thus, there is a window in which the aliasing is allowed. The aliasing window can occupy for example a central part of the optical system's field of view. The switchable FOV filter may have intermediate states, while a need for them may arise or increase with arise or increase of non-a uniformity of aliasing in the aliasing window. From captured images, a zoomed-in and a zoomed-out image can be reconstructed. The most zoomed-in image corresponds to a whole or to a part of the aliasing window; this image is geometrically superresolved.

In some embodiments, the switchable filter can switch OFF or/and ON within a relatively short time, in particular time shorter than a characteristic time of an object scene change or than a time needed for moving a lens in the technique of FIG. 1 and the likes for obtaining the same zooming factor. Two captured images thus will qualitively correspond to each other and will allow obtaining a qualitive reconstruction of the zoomed-in and zoomed-out images. If the switchable filter is the LSF filter, it may be in the form of a diaphragm (shutter) and the filtering can be switched ON, for example, by partially closing a diaphragm in an aperture plane or another spectral plane. If the switchable filter is the FOV filter in the form of a diaphragm (shutter), and the filtering can be done, for example, by partially closing a diaphragm in the intermediate image plane. The diaphragm may be, for example, a mechanical or an electrical liquid crystal shutter. In the technique of the invention, act of zooming relates to switching the installed LSF into its less transmitting state (termed "OFF" state) or switching the FOV filter into its higher transmitting state (termed "ON" state) in some sense.

Thus, in some embodiments, the imaging system does not have any lenses that are moved for zooming. Moreover, in some embodiments, the optical system does not have any parts that are moved for zooming. Typically, moving a lens requires time and accuracy; this makes imaging a fast changing object scene both with and without zoom difficult. The technique of the present invention may facilitate zooming in particular for imaging fast changing object scenes.

It should be understood that an orthogonal spatial frequency (OSF) filter, as well as partially orthogonal spatial frequency (POSF) filter, is configured for transmitting some spatial frequencies in a positive and a symmetrical to it negative aliasing band, e.g. a first aliasing band, of the PDA (symmetry with respect to a zero frequency). These transmittable frequencies cover different frequencies in a central Nyquist band of the PDA upon aliasing (folding). A part of a positive or a negative aliasing frequency band that is transmittable by the OSF or POSF filter is defined by a cut-off frequency of light received by the detector. This cut-off frequency is the smallest one of cut-off frequencies of an object scene and of the optics in front of the detector. If the cut-off frequency of light received by the detector matches the boundary frequency of some Nyquist aliasing band, then no more than a half of the frequencies of this band is transmittable by the filter. The OSF filter is such that, upon folding, its aliased transmitting frequencies overlap neither with other aliased transmitting frequencies (e.g. from other aliasing Nyquist bands) nor with transmitting frequencies of the central Nyquist band. As for the POSF, it has a certain degree of orthogonality such that, depending on said degree of orthogonality a certain overlap between the above specified frequencies occurs.

Thus, the OSF filter blocks some spatial frequencies within the central Nyquist band of the PDA and transmits some spatial frequencies in an aliasing band of the PDA. Selection of these transmitting spatial frequencies prevents mixing of these frequencies with each other in the central Nyquist band of the PDA; in this sense the selection is orthogonal. Herein, the central Nyquist band is the band confined by a negative and a positive Nyquist frequency of the PDA (i.e. $-v_{NY}$ and $v_{NY}$); the aliasing band is the non-continuous band including all spatial frequencies with magnitude larger than $v_{NY}$; and the first aliasing band is a union of a first negative and a first positive aliasing bands $(-3v_{NY}, v_{NY})$ and $(v_{NY}, 3V_{NY})$. The OSF filter can be an orthogonal mask described in the aforementioned PCT publication WO 2004/102958, incorporated herein by reference.

The POSF transmits some spatial frequencies in the aliasing band of the PDA, and selection of these transmitted aliasing spatial frequencies in any Nyquist band prevents mixing of these frequencies with each other in the central Nyquist band of the PDA. The POSF filter may or may not block some spatial frequencies within the central Nyquist band of the PDA. In some POSF filters, the aliased spatial frequencies transmittable by the filter are allowed to mix with transmitting central Nyquist band's spatial frequencies. Similarly, in some POSF filters the aliased spatial frequencies from different Nyquist bands are allowed to mix with each other. The partial orthogonality is actually achieved when there is at least one transmitting aliasing spatial frequency, i.e. a transmitting spatial frequency from the aliasing band, which aliases into the central Nyquist band and mixes there with a transmitting frequency from a different Nyquist band (however not symmetrical to said aliasing band transmittable by the filter).

A transmittance level, from which a certain spatial frequency of a spatial filter is called herein "transmitting", in some embodiments is 10%, in some other embodiments is 15%, and in some other embodiments is 20%.

As it has been mentioned above, the optical focusing system, associated with a certain PDA pixel pitch, in some embodiments has an aliasing window. There may be an optimal size of the aliasing window, dependent on relative availability of various optical parts and partially orthogonal spatial frequency (POSF) filters. For example, it may be easier to assemble an optical focusing system with non-uniform resolution. For another example, it may be easier to configure a POSF or OSF filter as a diffractive mask, as in some embodiments below. For yet another example, it may be desired to use an OSF or a POSF filter constructed as a diffractive or non-diffractive phase mask, because of the available selection of materials and fabrication methods for the phase masks (e.g. by a photolithographic process using a photopolymer; for mass production purposes it is possible to use stamping).

Also, the mask may be specially adapted for use with coherent light (the mask may be so configured to make the PSF of coherent light positive).

In any case, in alternative to the configuration with aliasing window, the imaging system can be such that its optical resolution is smaller than the geometrical resolution in the whole field of view. Such an imaging system can be utilized in situations in which the field of view presents a sufficiently small object on a sufficiently low-detailed background. If the object is within the window for zooming in and the background contains only spatial frequencies within the central Nyquist band, then the imaging will bring the same results as in the case with the aliasing window. Accordingly, the same reconstruction of zoomed-in and zoomed-out images will be possible.

For clarifying the limits of the aliasing window, it should be noted, that with the optical resolution denoted d and the pixel pitch denoted p, the aliasing window can be defined by inequality $d(x,y)<p$, where $(x,y)$ are coordinates in the image (PDA) plane. The optical resolution can be non-uniform, and in this case it is convenient to define it through the point spread function (PSF): optical resolution in an image plane point $(x,y)$ is a size of a region having the PSF larger than 20% (alternative definitions may use other fractions). Herein, the point source is assumed to be located in the in-focus object plane point corresponding to the image plane point $(x,y)$; the resolution varies depending on the position of this object plane point source in its plane. The size of the region is measured along a certain direction; in other words, resolution can be different along different directions. In the rest of the field of view (i.e. in a non-aliasing part) the optical resolution may be slightly larger than the geometrical resolution, for example, an inequality $p \leq d(x,y) \leq 1.2 p$ may be satisfied.

As it has been mentioned above, in examples below the aliasing window occupies a central part of the field of view; the non-aliasing part of field of view therefore corresponds in these examples to the peripheral part of the field of view. Also, in some examples below, an imaging system's aliasing factor $m=p/d$ in the aliasing window defines a resolution enhancement factor, i.e. a ratio $k=r_{z-o}/r_{z-i}$ between imaging resolutions in the zoomed-out and zoomed-in images. In these cases, the resolution $r_{z-o}$ of the zoomed-out image is of about the PDA's geometrical resolution, and the resolution $r_{z-i}$ is of about the zoomed-in aliasing window's optical resolution. The resolution enhancement factor can be also called zooming factor.

It is illustrative to consider adaptation of an optical focusing system for a desired zooming factor. A first exemplary optical system will have a cut-off spatial frequency f in a periphery part and a cut-off spatial frequency 2 f in a central third part (along each direction, i.e. the ninth part by area). The aliasing window is thus the central third. For the sake of simplicity, a rectangular field of view is assumed.

In some embodiments of the invention, the 3-times zooming (M=3) can be obtained with acquisition of two images (frames) only, irrespective of whether the switchable filter is located in the spectral plane of the system, i.e. at the entrance pupil/aperture-stop/exit pupil or in the intermediate image plane; and, when the switchable filter is in the spectral plane, irrespective of whether an OSF or POSF is used.

The inventors have found that when operating with an OSF, an M-times zooming with for example M>3 can be obtained using acquisition of two frames only, irrespective of whether a switchable filter is in the intermediate image plane or is at the spectral plane of the system.

Generally speaking, when using the switchable filter at the spectral plane, the number of frames required for M-times zooming with M>3 depends on a degree of orthogonality of an orthogonal spatial filter: the lower the degree of orthogonality the higher number of frames in needed. This is because the degree of orthogonality actually depends on a number of aliasing Nyquist bands involved (incident on the imaging system and passed by the optics). An orthogonal spatial filter might no longer be orthogonal when an additional aliasing Nyquist band is passed by the optics. In fact, this additional aliasing Nyquist band might fold into that or those frequency(ies) which is/are already occupied by aliased original Nyquist band(s). Accordingly, the orthogonal spatial filter has a certain degree of orthogonality with respect to the number of Nyquist bands involved: decrease in the degree of orthogonality could be compensated by increase in the number of acquired frames with different states of switchable spatial frequency filter (e.g. LSF filter). By setting the cut off frequency of the switchable spatial frequency filter at a lowest frequency of the additional Nyquist band, and acquiring an image at this state of the switchable spatial frequency filter, it can be identified (by processing) whether the aliased features in the captured image have been folded from the additional Nyquist band or not. This processing may be repeated for one or more times, until reconstructing the object.

Also, the operation with two switchable filters, one LSF and one FOV, allows for M-times zooming (e.g. M>3) irrespective of whether OSF or POSF is used. In this case the above described processing technique can be used.

It should also be understood that the use of orthogonal spatial filters with lower degree of orthogonality allows for receiving less noisy reconstructed images. This is because such orthogonal spatial filters with lower degree of orthogonality sample spectral space more frequently. Accordingly, there is a certain trade-in between noise and the number of frames to be taken.

If the desired zooming factor is 2, the technique can be applied in the following way. A PDA with a Nyquist spatial frequency f and corresponding to the desired field of view side length is selected (taking a PDA with a larger Nyquist frequency is also possible, though this with the selected side length will mean the use of a larger amount of smaller pixels, and therefore an increase in shot noise and a complication of read-out circuitry). The selected PDA is installed in the image plane. A low spatial frequency (LSF) filter switchable between ON and OFF states is installed in the spectral plane. This filter can be a tunable diaphragm. The filter is such that in the ON state it blocks all spatial frequencies with magnitude larger than Nyquist frequency f and transmits all frequencies with magnitude smaller than Nyquist frequency f; and in the OFF state it transmits all frequencies with magnitude smaller than 2 f.

By imaging an object scene with the filter ON and with the filter OFF, two images are obtained. The respective first of these images does not contain any aliased frequencies. The respective second of these images can contain aliased frequencies: spatial frequencies in intervals (−2 f, −f) and (f, 2 f) coming from the object scene in the aliasing window are transmitted through the optical system and through the filter (amplitudes of these spatial frequencies are multiplied by the relevant transfer functions though) and thus can fall on the PDA. Since the frequencies in intervals (−2 f, −f) and (f, 2 f) are undersampled, they are subject to aliasing. By the aliasing, interval (−2 f, −f) is mirror-reflected (folded) relatively the Nyquist frequency −f and becomes mapped into a reverse interval (0, −f). Similarly, interval (f, 2 f) is mapped into reverse interval (f, 0). The aliased frequencies do not mix with each other, thanks to the absence of overlap between the reverse intervals. The aliased frequencies can only mix with object scene low frequencies, lying in the central Nyquist band (−f, f). The reconstruction of the low frequency representation of the object scene is possible from the first, low-resolved, image (it would use the scaled Fourier transform defined by the optics to arrive from the image domain into the spectral domain, and the optical system and switched ON LSF filter transfer characteristics to arrive to the object scene representation). Therefore, the reconstruction of the high frequency representation of the object scene becomes possible. This reconstruction would be a result of a subtraction from the second image spectral representation of the found low-frequency object representation transferred through the optics and switched OFF LSF filter. This subtraction is actually the second image spectral representation in the aliased spatial frequencies. This representation can be unfolded into the original bands ((−2 f, −f) and (f, 2 f)) of the aliased frequencies. The unfolded representation is divided by the relevant transfer coefficients of the switched OFF LSF filter and the optical system. The high-frequency representation of the object scene is thus established. Consequently, the high spatial frequencies and the low spatial frequencies of the object scene become reconstructed. This reconstruction, virtually (i.e. by way of calculation) transferred through the optics and focused on the image plane, provides the desired resolution enhanced (zoomed-in) image of the aliasing window. The respective zoomed-out image is just the first image, taken with the LSF filter ON. The calculated zoomed-in image is superresolved.

A second exemplary optical system has a cut-off spatial frequency f in a periphery part and a cut-off spatial frequency 3 f in a central third part. The desired zooming factor accordingly is three. The same PDA with a Nyquist spatial frequency f is assumed. This time the LSF filter is such that in the ON state it blocks all spatial frequencies with magnitude larger than Nyquist frequency f and transmits all frequencies with magnitude smaller than Nyquist frequency f; and in the OFF state it transmits all frequencies with magnitude smaller than 3 f. The imaging system in the present example is used also with a partially orthogonal spatial frequency (POSF) filter. This POSF filter is generally as described above.

A particular POSF filter can be a mask that transmits all frequencies between −f and f and codes light in regions (−3 f, −f) and (f, 3 f) by transmitting only a half of spatial frequencies of these regions to the image plane. The POSF filter in each of these spectral regions can be of a comb (uniformly coding) structure. The combs can be symmetric with respect to the zero spatial frequency. The aliasing of the combs' frequencies will result in "folding" of the combs. The aliased spatial frequencies of the folded combs will not however overlap and will not mix with each other. They will only mix with object scene low frequencies, lying in the central Nyquist band (−f, f). Thus, the reconstruction procedure outlined in the previous example will stay valid. The reconstruction may produce a somewhat noisier high frequency representation of the object scene: the reconstructed high frequencies will be separated by twice more distance than in the previous example. The high frequencies after reconstruction are higher than the spatial periodicity of the pixels in the detector.

Alternatively, the POSF filter can be a mask that transmits all frequencies between −f and f and codes light in regions (−3 f, −f) and (f, 3 f) by transmitting only a third of spatial frequencies falling in these regions. Again, the transmitted through the POSF filter frequencies will form comb structures. Upon aliasing (folding), the aliased frequencies will not completely cover the central Nyquist band. However, the aliased frequencies again will not mix with each other. The above described reconstruction procedure therefore stays valid.

A yet another, third, exemplary optical system has a cut-off spatial frequency f in a periphery part and a cut-off spatial frequency 5 f in a central third part. The desired zoomed factor accordingly will be 5 (no doubt, it can be smaller than 5). This time, the LSF filter will switch between three states: in a first ON state its cutoff will be f, in a second ON state its cutoff will be 3 f, it an OFF cutoff its cut-off will be larger than 5 f. The POSF filter can be a mask that transmits all frequencies between −f and f and codes light in regions (−5 f, −f) and (f, 5 f) by transmitting only a half of spatial frequencies falling in these regions.

The imaging is to be performed three times, with the switchable filter in the first ON state, in the second ON state, and in the OFF state. The first image is to provide information on spatial frequencies between −f and f. The second image is to provide information on spatial frequencies between −3 f and −f and also f and 3 f. Likewise, the third image is to provide information on spatial frequencies between −5 f and −3 f and also 3 f and 5 f. The frequencies from the intervals (−5 f, −3 f) and (3 f, 5 f) will alias to the central Nyquist region in the third image; however as soon as the distributions of the frequencies (combs) are symmetrical with respect to the zero frequency, the distributions of the aliased frequencies are orthogonal (i.e. their aliased frequency distributions do not mix with each other). It thus should be understood, that introduction into a zoomed image of a spatial frequency from yet another Nyquist interval will improve (decrease) the resolution of the zoomed image, but it will need an additional image taking and an additional step in the reconstruction process.

The following should be noted with regards to the above comb (in some embodiments regionally uniformly coding) filters. The PDA has a limited number of pixels; therefore the Fourier transform applied to an image captured by the PDA results in a finite set of harmonics. Spatial frequencies of these harmonics are natural to the PDA lattice. Moreover, the PDA's reciprocal space (the spectral or spatial frequency space) has spectral pixels, similarly to the direct space. Accordingly, in some embodiments, the filter's comb is selected so as to match the reciprocal space: to operate at frequencies aliasing with the pixel lattice natural frequencies and with uniform comb teeths' widths of about the spectral pixel width. Such combs thus are mapped into spectral pixels. In other words, the filter structure becomes matched to the structure of the PDA spectral space: a filter "pixel" is received by one spectral pixel. When a distribution of the filter pixels is restored from a distribution of the spectral pixels, the restoration can be performed with no need for resolving a chain of coupled equations. Thus, when operating with the spectral pixels, individual pixels or groups of pixels (called macropixels) can be conveniently considered.

As well, the optical focusing system will provide zoom if used with the field of view (FOV) filter, i.e. space filter, as it has been mentioned above. Utilizing the FOV filter can save energy in the zoom area. To obtain zoom, imaging may be performed only twice: with the FOV filter ON and the FOV filter OFF.

Considering the exemplary optical system with a cut-off spatial frequency f in a periphery part and a cut-off spatial frequency 3 f in a central third part, this system can be equipped with a switchable FOV filter, switching between the full field of view and the aliasing window, and an orthogonal spatial frequency (OSF) filter, as described above. The OSF filter may transmit every third spectral pixel in the central Nyquist band, the first negative aliasing band, and the first positive aliasing band. Thus, the transmitting "combs" become formed in the central Nyquist band and in the aliasing band. These combs do not form a single comb, because on the border of the bands the periodicity is interrupted. This interruption is selected so as to provide the desired orthogonality: the folded aliasing bands mix neither with each other nor with the transmitting spatial frequencies of the central Nyquist band.

Reconstruction of the zoomed-in image is straight-forward. In the spectral space, macropixels, each consisting of three pixels, are formed. In each macropixel there is a pixel formed due to the aliasing of a transmitting spatial frequency from the negative aliasing band, a pixel due to a transmitting frequency in the central Nyquist band, and a pixel due to the aliasing of a transmitting spatial frequency from the positive aliasing band. By dividing the spectral space into the macropixels, and sampling each macropixel for its central Nyquist band pixel, the central Nyquist band is reconstructed. By sampling each macropixel for its aliased band originated pixels, the aliasing bands are reconstructed. The spatial spectrum of the object scene part visible through the aliasing window is then received by dividing the restored aliasing window spectrum by relevant optics transfer coefficients.

Reconstruction of the zoomed-out image is done in the following way. In the zoomed-out image, the central part should be as in the zoomed-in image with high spatial frequencies removed. Since the zoomed-in image is restored, the central part of the zoomed-out image can be obtained by filtering. The periphery part of the field of view either does not provide high spatial frequencies or these frequencies are filtered out by the optics. Therefore, a spectrum of the image taken with the full field of view is composed out of two terms: spectrum of the object scene periphery transferred by the optics and filtered by the OSF filter, and the already detected aliased spectrum of the field of view's center. Spectra of the periphery and the center mix in the Nyquist central band, but since the spectrum of the center is already detected, the spectrum of the periphery can be obtained from the measurement by subtraction. The restored "image plane" spectrum of the periphery is divided then by the relevant transfer coefficients of the OSF filter and the optics, and the spectrum of the object scene periphery becomes reconstructed. The spectrum of the full visible object scene, relating to the zoomed-out image, is then reconstructed from the spectra of its peripheral and central parts.

Considering the exemplary optical system with a cut-off spatial frequency f in a periphery part and a cut-off spatial frequency 5 f in a central fifth part, the OSF filter for use with this system may transmit every fifth spectral pixel in the central Nyquist band, the first negative aliasing band, and the first positive aliasing band, the second negative aliasing band, and the second positive aliasing band. Reconstruction of the zoomed-in image may again be performed by taking an image with the FOV filter ON and sampling the spectral space, i.e. sampling each fifth of the spectral pixels, unfolding the sequence into the relevant aliasing band (or leaving it in the central Nyquist band), sampling another fifth of the spectral pixels, unfolding the sequence into the relevant aliasing band, etc. Reconstruction of the zoomed-out image may be performed as in the case above.

The technique of the invention can be also explained in terms of image replicas, appearing in some embodiments. The OSF/POSF filter may be a replicating coding mask (grating) configured to divide light incident thereon into replicas, slightly non-identical, due to the coding alignment in between different Nyquist bands. It should be understood that a number of replicas created for each of various uniformly coded Nyquist bands is the same, if a period of this coding is the same. There may be an interruption of the periodicity of the uniform coding extending through multiple Nyquist bands, so as to provide a desired degree of orthogonality of the coding. Such interruption of the periodicity affects the degree of said alignment. When the mask and the corresponding PDA are installed, the generated replicas are distanced from each other by non-integer numbers of the PDA pixels. These replicas will thus provide non-identical, complementary, information about the object scene. Since, generally, replicas occupy more space than a single image, the aliasing window is selected to be in the center and to occupy only a portion of the sensor (PDA).

Generally, regionally uniform or non-uniform codes can also be used. For example, a regionally uniform code can be uniform with a first period in the central Nyquist band, and uniform with a second period in the first aliasing band. In this case, image features presented through spatial frequencies in the central Nyquist band are replicated in a certain, corresponding to the first period, number of replicas, while image features presented through spatial frequencies in another Nyquist band are replicated in a certain, corresponding to the second period, number of replicas. In some embodiments, the aliasing window is smaller than the full field of view as many times as the maximal number of replicas generated. In such cases, it can be guaranteed that no information is lost, because all the replicas will fall on the PDA. A non-uniform code may for example be such that it lacks periodicity in at least one spatial frequency spectral region. This might be useful for correcting for non-uniformity in the spatial spectrum of the PDA response.

The POSF filter may also be a replicating mask, but it may replicate, for example, only high frequency features. More specifically, such filter may configured for cut-off at 3 Nyquist frequencies, while transmitting the entire central Nyquist band and a half of the first aliasing Nyquist band. In this case, low spatial frequency features are not replicated at all, while high spatial frequency features are replicated twice. Accordingly, the aliasing window can be 2 times smaller than the full field of view. If the cut-off of the system is lower than 3 Nyquist frequencies, then the aliasing window can be larger.

It should also be noted that, generally, the technique of the present invention (i.e. the use of a switchable LSF filter) allows for implementing a zoom by combining a time and code division techniques. In an ultimate case, code division is actually not needed, because the LSF filter can be operated in a cut-off sweeping mode, the acquired sequence of frames thus corresponding to different cut-offs, allowing object reconstruction.

With regards to fabrication of the orthogonal and partially orthogonal (OSF and POSF) filters, the following should be noted. The filter may be fabricated as an amplitude only mask, a phase only mask, or an amplitude-phase mask. The filter is either in the form of a fixed pattern (the so-called "passive mask") or variable pattern ("active mask") of spaced-apart regions with different optical properties. The filter may thus be in the form of a pattern of spaced-apart light transmitting and blocking regions, a phase grating, or a Spatial Light Modulator (SLM) operable to selectively define a desired pattern of spaced-apart regions of different optical properties. The pattern may be provided on the surface of the lens or thereinside. Considering polarized input to the SLM, the SLM may perform the amplitude or phase coding, depending on whether it is equipped with an output polarizer or not, respectively.

The OSF and POSF filters may be located upstream or downstream of the lens arrangement close thereto, or may be incorporated within the lens arrangement. It should be noted that, generally, the filters may be located at any known distance from the imaging lens, provided the filter configuration takes into account this distance.

There is thus provided according to one broad aspect of the invention, an imaging system for use in imaging with zoom, the system comprising a pixel detector array (PDA), an optical focusing arrangement, and a spatial filter configured and operable to selectively switch between at least two different transmitting states, distributions of an optical resolution of the optical focusing arrangement and of a geometrical resolution of the PDA defining an aliasing window along an at least one direction.

The spatial filter may be a filter of spatial frequencies, or a filter of space. The spatial filter may be configured as a diaphragm or shutter.

According to another broad aspect of the invention, there is provided a partially orthogonal spatial frequency (POSF) filter comprising a grating having a selected spatial frequency transmission profile, a cut-off frequency of said profile, and at least one blocking frequency smaller than a half of the cut-off frequency within said profile, said blocking frequency being capable of being used as a Nyquist frequency in imaging with zoom, the blocking frequency defining a Nyquist band structure of said transmission profile, the structure having each positive and a symmetrical to it negative aliasing band folding in non-overlapping way into a central Nyquist band, and the profile having at least one transmitting spatial frequency folding into the central Nyquist band and therein mixing with a transmitting frequency from a any Nyquist band.

According to yet another broad aspect of the invention, there is provided a kit for use in imaging with zoom, the kit comprising a pixel detector array (PDA) and a spatial frequency filter having a distribution of spatial frequency transmitting and blocking regions selected to partially orthogonally code spatial frequencies with respect to Nyquist bands of said PDA.

According to yet another broad aspect of the invention, there is provided a kit for use in imaging with zoom, the kit comprising a pixel detector array (PDA), a spatial frequency filter having a distribution of spatial frequency transmitting and blocking regions selected to orthogonally code spatial frequencies with respect to Nyquist bands of said PDA, and a spatial filter configured and operable to selectively switch between at least two transmitting states.

According to yet another aspect of the invention, there is provided a kit for use in imaging with coding, the kit comprising a pixel detector array (PDA) and a spatial frequency filter having a distribution of spatial frequency transmitting regions, each of the regions interrupting within 10% of a PDA spectral pixel pitch from a PDA spectral pixel.

According to yet further aspect of the invention, there is provided a processing unit for use in imaging with zoom, the processing unit configured to sample a spatial spectrum of a coded image of an object scene for aliased spatial frequencies and to unfold the sampled aliased spectrum into upper Nyquist bands, the sampling and unfolding based on a respective to the coded image partially orthogonal code and a non-aliased zoomed-out image of the object scene, the unit thereby configured to generate a zoomed-in image of the object scene.

According to yet further aspect of the invention, there is provided a processing unit for use in imaging with zoom, the processing unit configured to sample a spatial spectrum of a coded image of a part of an object scene for aliased spatial frequencies and to unfold the sampled aliased spectrum into upper Nyquist bands, the sampling and unfolding based on a respective to the coded image orthogonal code, and configured to sample a spatial spectrum of a coded image of the object scene for spatial frequencies of the part's complement, the unit thereby configured to generate a zoomed-in and a zoomed-out image of the object scene.

According to yet further aspect of the invention, there is provided a processing unit for use in imaging with zoom, the processing unit configured to sample a spatial spectrum of a coded image of a part of an object scene for aliased spatial frequencies and to unfold the sampled aliased spectrum into upper Nyquist bands, the sampling and unfolding being based on a respective to the coded image partially orthogonal code, and configured to sample a spatial spectrum of a coded image of the object scene for spatial frequencies of the part's complement, thereby generating a zoomed-in and a zoomed-out image of the object scene.

The invention in its yet another aspect provides a method of imaging, the method comprising imaging an object scene by an imaging system comprising a pixel detector array (PDA), an optical focusing arrangement, and a spatial filter configured and operable to selectively switch between at least two transmitting states, distributions of an optical resolution of the optical focusing arrangement and of a geometrical resolution of the PDA defining an aliasing window along an at least one direction.

The invention also provides a method of imaging with a pixel detector array (PDA), the method comprising partially orthogonally coding incoming light with respect to Nyquist bands of said PDA.

In yet another aspect, there is provided a method of imaging with a pixel detector array (PDA), the method comprising orthogonally coding incoming light with respect to Nyquist bands of said PDA, and switching a spatial filter configured and operable to selectively switch between at least two transmitting states.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 25A shows an original image (object) having the barcode pattern 3 times higher than resolving ability of a sensor; FIG. 25B shows the central region of an image captured by the sensor with resolving ability 3 times lower than the barcode pattern; and FIG. 25C shows 3-times zoomed image obtained using the above technique (with switchable filter) with the same sensor;

FIGS. 29A-29C show, respectively, an example of partially orthogonal coding, an example of orthogonal regionally uniform coding, and macro-pixels obtained by imaging with the orthogonal regionally uniform code;

FIG. 30 illustrates aliasing of 2 aliasing Nyquist bands into the central Nyquist band;

DETAILED DESCRIPTION OF THE PREFERRED EMBODIMENTS

Figure 1:
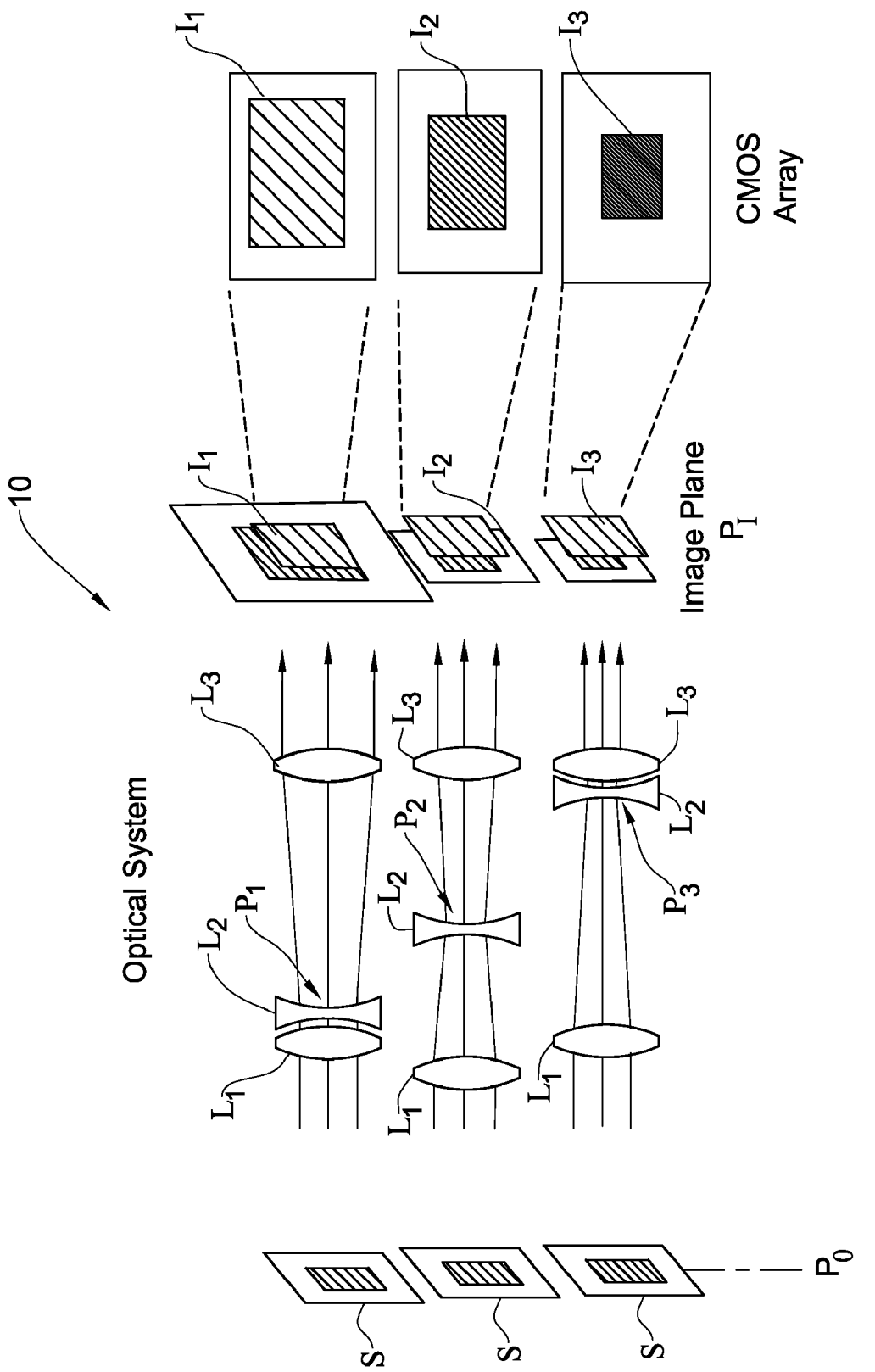
FIG. 1 is a conventional optical system capable of implementing a zooming.

FIG. 1 shows a conventional optical system capable of implementing a zooming.

Figure 2:
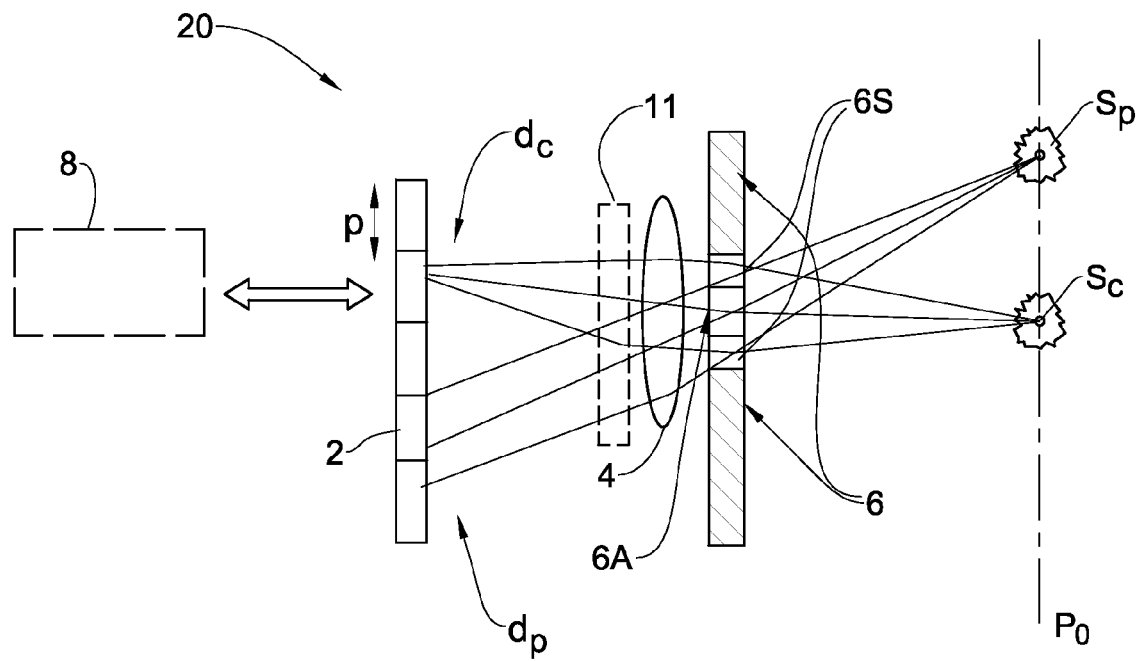
FIGS. 2 and 3 show two examples, respectively, of an imaging system according to the invention utilizing a switchable filter located in, respectively a spectral plane of the system and an intermediate image plane.

Referring to FIG. 2, there is schematically shown an imaging system 20 according to an example of the present invention. The system 20 includes a pixel detector array (PDA) 2, an imaging lens unit 4 (formed by a single imaging lens in the present example), and a switchable spatial filter 6. The filter defines an aperture 6A and is configured and operable to selectively switch between two or more different light transmitting states within the aperture region, two transmitting states being exemplified in the figure: the filter parts 6S switch between transmitting and opaque states, in response to a suitable control signal. Currently, parts 6S are shown as transmitting.

Imaging system 20 is in its assembled operative state; it is focused on a plane $P_O$. In this plane there are two point-like light sources, $S_C$ and $S_P$, the first being in a central region of the field of view of the system, the second being rather on a periphery of the imaging system's field of view. The imaging system has an optical resolution $d_c$ for source $S_C$ smaller than a pixel pitch p, and an optical resolution $d_p$ for source $S_P$ larger than a pixel pitch p. Imaging system 20 therefore has an aliasing window along an axis normal to the optical axis of the imaging system along the shown PDA side.

The imaging system can be used for imaging with a zoom of at least a part of the system's filed of view. Filter 6 is a spatial frequency filter and it will prevent some relatively high spatial frequencies from reaching the sensor when the filter is switched ON corresponding to the opaque state of parts 6S. Thus, switching the filter ON will at least reduce aliasing in the aliasing window. Comparing more aliased and less aliased images will provide at least some information about object scene's spatial frequencies higher than the PDA's Nyquist frequency.

Parts 6S can be sized so as to totally remove aliasing in the aliasing window. The filter's OFF state may be selected with the parts' 6S transmission bringing the imaging system into the non-aliasing regime.

Imaging system 20 might be associated with a processing unit 8 (which may or may not be a constructional part of the system). Processing unit 8 is a computational circuit, adapted to reconstruct zoomed-in and zoomed-out images. It may be a specially programmed computer.

Thus, the switchable spatial filter 6 is configured as a shutter-like diaphragm. In the above-described example of FIG. 2, the filter 6 is accommodated in the spectral plane of the imaging system and thus constitutes a low spatial frequency (LSP) filter.

As shown in FIG. 2 in dashed lines, in some embodiments of the invention based on the use of LSP filter, the system may further include a partially orthogonal spatial frequency (POSF) filter 11. The latter is configured as described above and is accommodated in the vicinity of a spectral plane of the system, i.e. close to the lens of the lens unit 4. Considering the specific example of FIG. 2, partially orthogonal filter 11 can be located at any place in the optical path of light passing through the system, close to lens 4.

Figure 3:
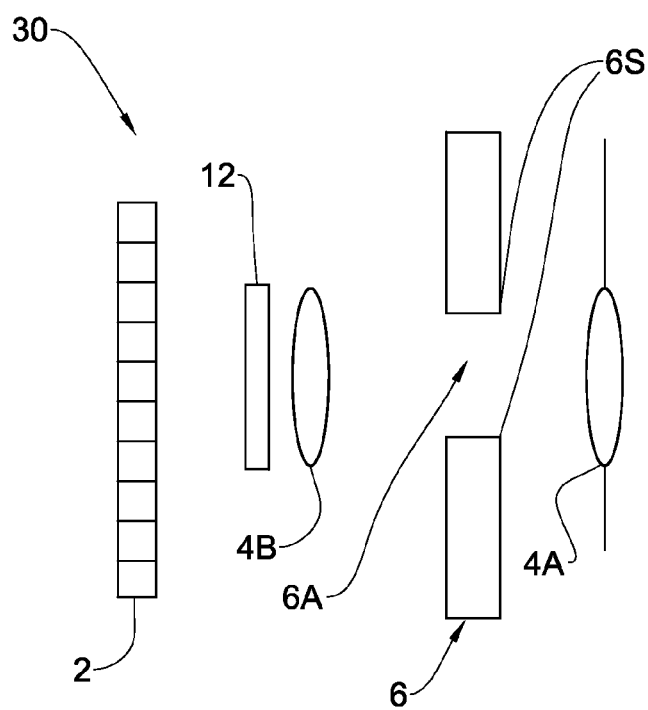

FIG. 3 shows an imaging system 30 according to another example of the invention. To facilitate understanding, the same reference numbers are used for identifying components that are common in the examples of the invention. System 30 is configured generally similar to the above-described system 20, namely includes an PDA 2, an imaging lens unit 4, and a switchable spatial filter 6. In system 30, in distinction to system 20, lens unit 4 is formed by two spaced-apart lensing elements 4A and 4B, and filter 6 is accommodated in an intermediate imaging plane of lens unit 4A and thus constitutes a filter of space. An orthogonal spatial frequency (OSF) filter 12 is accommodated downstream of filter 6 in a spectral plane of the system, i.e. close to lens 4B.

Figure 4A:
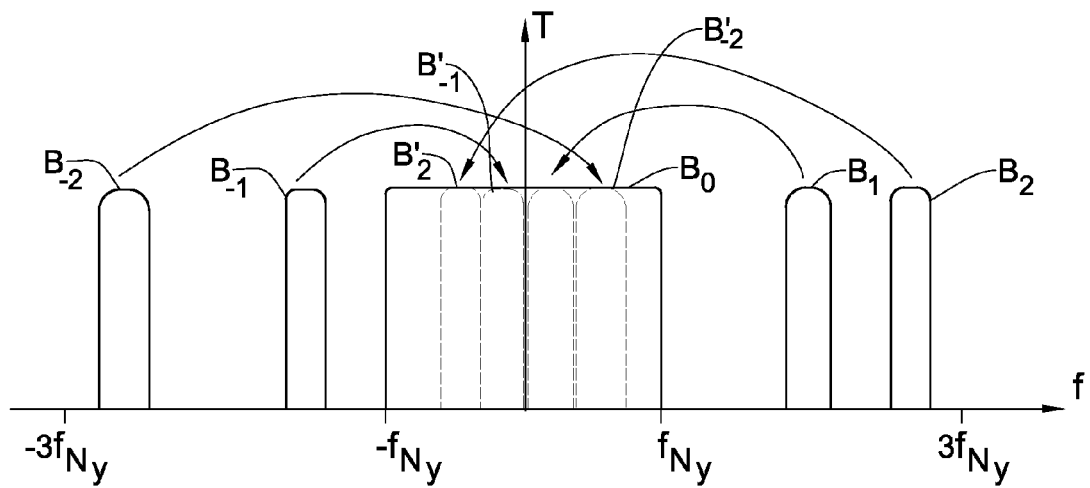
FIGS. 4A and 4B show respectively the POSF transmission profile and the OSF transmission profile.
Figure 4B:
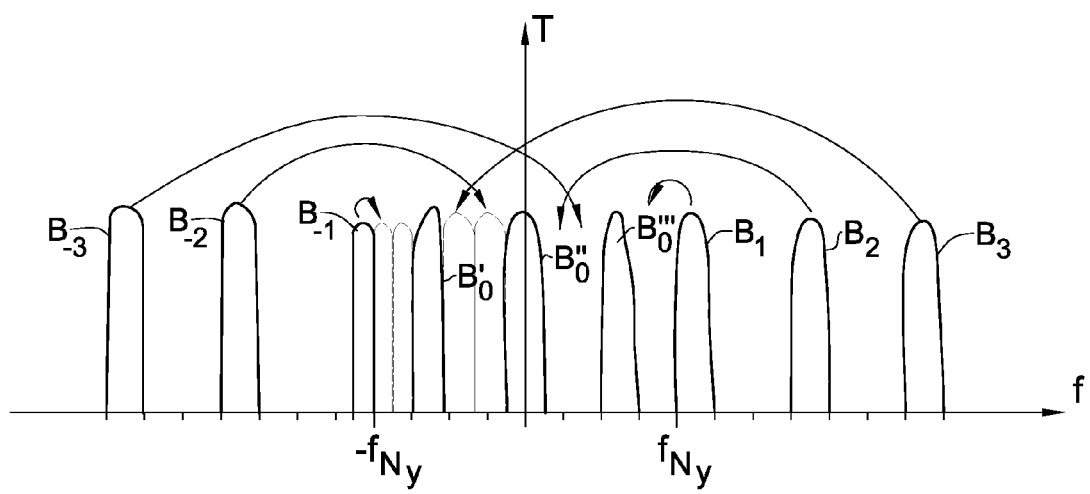

Reference is made to FIGS. 4A and 4B exemplifying the operation of POSF and OSF respectively suitable to be used in the invention. The OSF or POSF filter, when used with a lens whose aperture matches the filter's aperture, obtains a spatial frequency transmission profile that can be detected by a sensor placed in the lens' in-focus plane. The transmission profile of each of the POSF and OSF is constructed so as to enable operation of the system, with the certain lens aperture, with a desired Nyquist frequency of a PDA to be installed.

The illustrated POSF profile (FIG. 4A) has a transmission band $B_0$ from $(-f_{Ny})$ to $f_{Ny}$ in the corresponding central Nyquist band, and has transmission bands $B_{-1}$ and $B_{-2}$ and $B_1$ and $B_2$ in higher order Nyquist bands. The profile's cut-off is slightly smaller than 3 $f_{Ny}$ (it can be determined the filter's pattern or aperture or used with it optics). The profile's transmission bands in aliasing region are distributed so as not to mix with each other upon aliasing. Accordingly, as shown in the figure, each of the transmission bands $B_{-1}$, $B_{-2}$ when mirrored with respect to the corresponding Nyquist frequency $(-f_{Ny})$ will map into bands $B'_{-1}$, $B'_{-2}$, respectively, and similarly the transmission bands $B_1$, $B_2$ when mirrored with respect to the corresponding Nyquist frequency $f_{Ny}$ will map into bands $B'_1$, $B'_2$, respectively. The partial orthogonality signifies absence of overlap between the bands $B'_{-1}$, $B'_{-2}$, $B'_1$, $B'_2$, and at least one of these bands overlaps with the transmission band $B_0$. In this specific example, $B_0$ occupies the whole central Nyquist band, but it should be understood that in fact it could cover only a part thereof.

The OSF profile of FIG. 4B has a transmission band $B_0$ from $(-f_{Ny})$ to $f_{Ny}$ in the corresponding central Nyquist band, and has transmission bands $B_{-1}$, $B_{-2}$, $B_{-3}$, and $B_1$, $B_2$, $B_3$ in higher order Nyquist bands. In the OSF profile, the transmission band $B_0$ has three discrete sub-bands, $B'_0$, $B''_0$ and $B'''_0$. The profile's transmission bands in aliasing region are distributed so as not to mix with each other upon aliasing. Additionally, the condition of orthogonality signifies on the one hand absence of overlap between the bands $B'_{-1}$, $B'_{-2}$, $B'_{-3}$, $B'_1$, $B'_2$, $B'_3$ and on the other hand absence of overlap between each of these bands with the transmission sub-bands $B'_0$, $B''_0$ and $B'''_0$. It should be noted that in order to allow orthogonality, $B_0$ occupies only at most a part of a central Nyquist band. As shown in the figure, each of the transmission bands $B_{-1}$, $B_{-2}$, $B_{-3}$ when mirrored with respect to $(-f_{Ny})$ will map into bands $B'_{-1}$, $B'_{-2}$, $B'_{-3}$ respectively, and similarly the transmission bands $B_1$, $B_2$, $B_3$ when mirrored with respect to the corresponding Nyquist frequency $f_{Ny}$ will map into bands $B'_1$, $B'_2$, $B'_3$ respectively.

It should be understood that knowing a spectrum only within the central Nyquist band allows for reconstructing a low resolution image; knowing a spectrum within the central Nyquist band and in a part of aliased Nyquist band allows for reconstructing a higher resolution image.

The following are some examples of the technique of the present invention.

Figure 5:
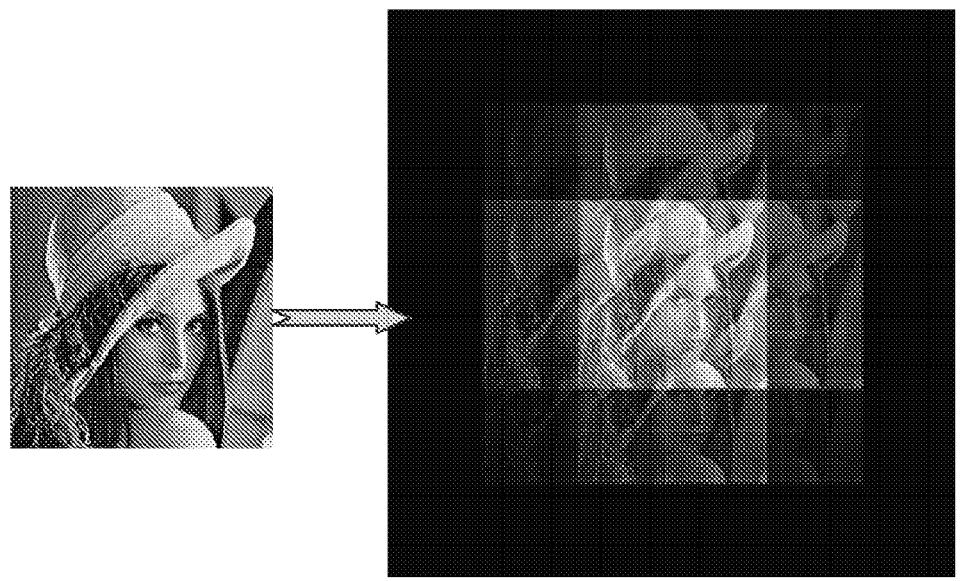
FIG. 5 exemplifies a result of imaging an object by an imaging system as in FIG. 3.

FIG. 5 exemplifies a result of imaging an object (Lena image) by an imaging system as in FIG. 3, arranged in the same way in two dimensions. The Lena image was in the center of the field of view of the system, and the spatial filter 6 (FOV filter) was ON. The effect of the OSF filter is observed through image replications created on the sensor 2.

Generally, the OSF filter can be used with the imaging system as in FIG. 3 as well as with the imaging system as in FIG. 2, in which case system 20 includes LSF filter 6 and OSF filter 12 (instead of POSF 11). This latter case is now more extensively considered.

The diaphragm (iris) is positioned in a spectral plane (also called CTF plane, after the coherent transfer function), thereby constituting an LSF filter 6. Two images are obtained using two consequently, almost instantaneously, captured fields. Optics has aliasing factor of 3 in the central ninth part of the field of view (by area), i.e. the aliasing window, and 1 in the peripheral part of the field of view. The first image is captured with degraded optical transmission function (OTF), using semi-closed position of the shutter 6. The second image is captured with non-degraded OTF, using open shutter 6. The zoomed-in and zoomed-out images are created using post-processing. Accordingly, the filter 6 changes the optical Modulation Transfer Function (MTF): in one state of the filter the MTF is limited to low resolution details only; and in the other state of the filter the MTF maintains original throughput, i.e. the image contains low-resolution and high-resolution parts. The high-resolution information is restored by subtracting the two images. The optical transfer functions of LSF filter 6 and OSF filter 12 are thus multiplied for each spatial frequency.

Figure 6A:
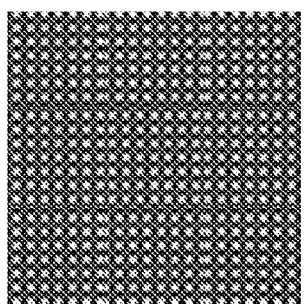
FIGS. 6A and 6B exemplify two operational positions of the system with an LSF filter is in its semi-open state (FIG. 6A) and in the open state (FIG. 6B)
Figure 6A:
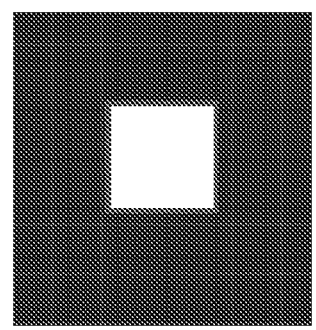
Figure 6B:
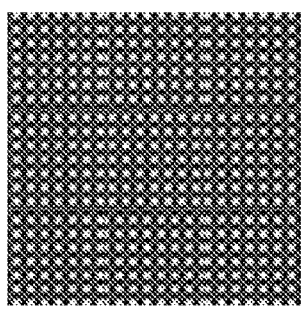
Figure 6B:
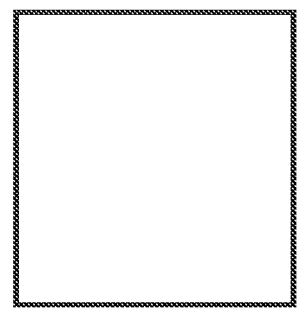

FIGS. 6A and 6B exemplify two operational positions of the system: in FIG. 6A LSF filter 6 is in its semi-open state and in FIG. 6B—in the open state. OSF 12 is configured as a spatial micro-prism grating composed of 9 parts: 8 grating blocks (on periphery) are affecting high-resolution information (higher order Nyquist bands) different from one another by a sub-period transverse translation, and 1 (central) grating block affects low-resolution (the geometrically resolved) information. OSF filter 12 is spatially symmetric.

Figure 7:
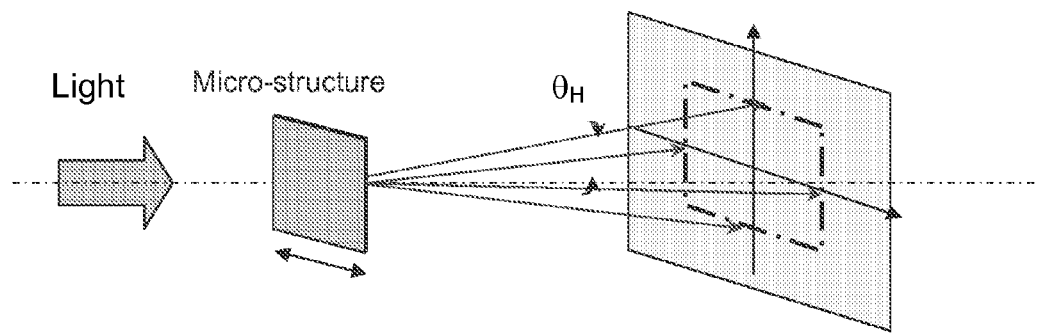
FIG. 7 shows a micro-structure of a low-resolution grating block.

More specifically, the low-resolution grating block is composed of periodic micro-structures. Each micro-structure is composed of 4 micro-prisms, which deflect light into 4 orders, as shown in FIG. 7.

As indicated above, the system captures two images with different transmission of the LSF filter 6. The first image is taken with degraded OTF of the system. Let us assume that $s(x)$ represents an object scene field passed through the optics, $S(v)$ is the Fourier transform of $s(x)$, where $v$ is the frequency coordinate belonging to the spectral range of $[-v_{max}, v_{max}]$, $v_{max}$ being the maximal spatial frequency of $s(x)$ and inversely related to the spatial resolution $\delta x$ in the object plane. Such details $\delta x$ can be seen only with the non-degraded OTF and super-resolution, since they are 3 times finer than the detector's pixel pitch ($S(v)$ is exemplified by a triangle because a typical optical system's OTF would provide it such envelope).

The imaging system passes the high resolution information, i.e. high spatial frequency information, ($S_{-1}(v)$ and $S_1(v)$) only in the central part $L_C \times L_C$ of the field of view. Low resolution information $S_0(v)$ can pass through the system in the whole field of view $L \times L$. $S_0(v)$ itself consists of two parts: $S_0(v) = S^c_0(v) + S^p_0(v)$, where $S^c_0(v)$ is due to the central region $L_C \times L_C$ and $S^p_0(v)$ is due to the periphery region.

Herein the Fourier content is virtually divided into three equal regions (FIG. 8):

(a) Left third $S_{-1}(v)$ with $v$ belonging to the spectral range $[-v_{max}, -\frac{1}{3} v_{max}]$ (b) Central third $S_0(v)$ with $v$ belonging to the spectral range $[-\frac{1}{3} v_{max}, \frac{1}{3} v_{max}]$ (c) Right third $S_1(v)$ with $v$ belonging to the spectral range $[\frac{1}{3} v_{max}, v_{max}]$.

The grating mask (OSF 12) multiplies (transfers) these spectral components so that orthogonality between the components is created. The coding grating mask also has three regions:

(a) Left third $G_{-1}(v)$ with $v$ belonging to the spectral range $[-v_{max}, -\frac{1}{3} v_{max}]$ (b) Central third $G_0(v)$ with $v$ belonging to the spectral range $[-\frac{1}{3} v_{max}, \frac{1}{3} v_{max}]$ (c) Right third $G_1(v)$ with $v$ belonging to the spectral range $[\frac{1}{3} v_{max}, v_{max}]$.

Figure 9:
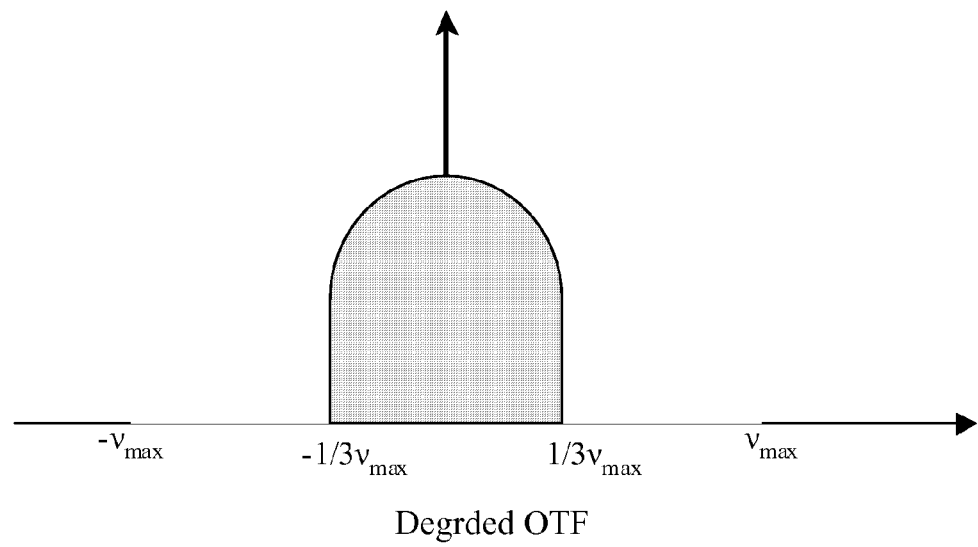
FIGS. 9 and 10 exemplify a degraded OTF limited to $\upsilon_{max}/3$ of the imaging system for obtaining the first image (FIG. 9) and not degraded OTF for obtaining the second image.

The imaging system has a degraded OTF limited to $v_{max}/3$ (FIG. 9). Thus high-resolution information content ($S_1(v)$ and $S_{-1}(v)$) is blocked.

The spectrum of an object captured by PDA (CCD/CMOS) sensor when the OTF is degraded is denoted by $I_0(v)$ and is expressed in the spatial domain as convolution:

$$i_0(x) = (s_0 * g_0)(x) \cdot rect\left(\frac{x}{L}\right) \quad (1)$$

where $s_0$ and $g_0$ are the inverse Fourier transforms of $S_0(v)$ and $G_0(v)$, respectively, and rect $(x/L)$ is defined as:

$$rect\left(\frac{x}{L}\right) = \begin{cases} 1 & |x| < L/2 \\ 0 & \text{otherwise} \end{cases} \quad (2)$$

In other words, when the shutter 6 is semi-open, $G_0(v)$ is the only relevant part of the filter 12 transfer function.

A low spatial frequency part of the orthogonal coding mask (filter 12) has a spatial effect similar to replications (see FIG. 5), i.e. $g_0(x)$ consists of three Dirac impulse functions:

$$g_0(x) = \sum_{n=-1}^{1} a_n \times \delta\left(x - \frac{nL}{3}\right) \quad (3)$$

Each $i_0(x)$ and $s_0(x)$ is now cut into sets of 3 equally-supported functions, denoted correspondingly as $r_j(x)$ j=1, . . . , 3 and $f_j(x)$ j=1, . . . , 3. These 2 sets of functions are related through 3 linear equations.

$r_1(x) = a_0 f_1(x) + a_1 f_2(x)$ $r_2(x) = a_0 f_2(x) + a_{-1} f_1(x) + a_1 f_3(x)$ $r_3(x) = a_0 f_3(x) + a_{-1} f_2(x)$ \quad (4)

or alternately through a 3×3 matrix:

$$\begin{bmatrix} r_1(x) \\ r_2(x) \\ r_3(x) \end{bmatrix} = \begin{pmatrix} a_0 & a_1 & 0 \\ a_{-1} & a_0 & a_1 \\ 0 & a_{-1} & a_0 \end{pmatrix} \begin{bmatrix} f_1(x) \\ f_2(x) \\ f_3(x) \end{bmatrix} \quad (5)$$

By inverting the matrix, $f_j(x)$ is determined and accordingly $s_0(x)$ and $S_0(v)$, the latter describing the low frequency content of the original image information. An example of coefficients that provide inverseable matrix and orthogonality are: $a_0 = a_1 = a_{-1} = 1$.

Figure 10:
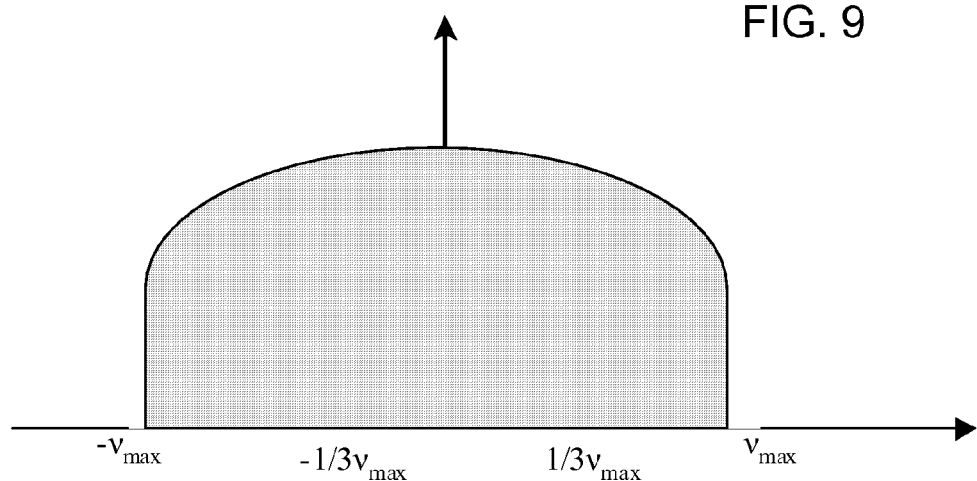

With regard to the second image, it serves for obtaining high-resolution information $S_1(v)$ and $S_{-1}(v)$. The OTF of the system when acquiring the second image is not degraded and is illustrated in FIG. 10. This means that the captured image includes aliased features. The spectrum $I(v)$ of an object captured by CCD/CMOS sensor is shown in FIG. 11 and is determined as:

$$I(v) = \sum_{k=-1}^{1} S_k(v) \times G_k(v) \quad v \in [-1/3 v_{max}, 1/3 v_{max}] \quad (6)$$

Figure 11:
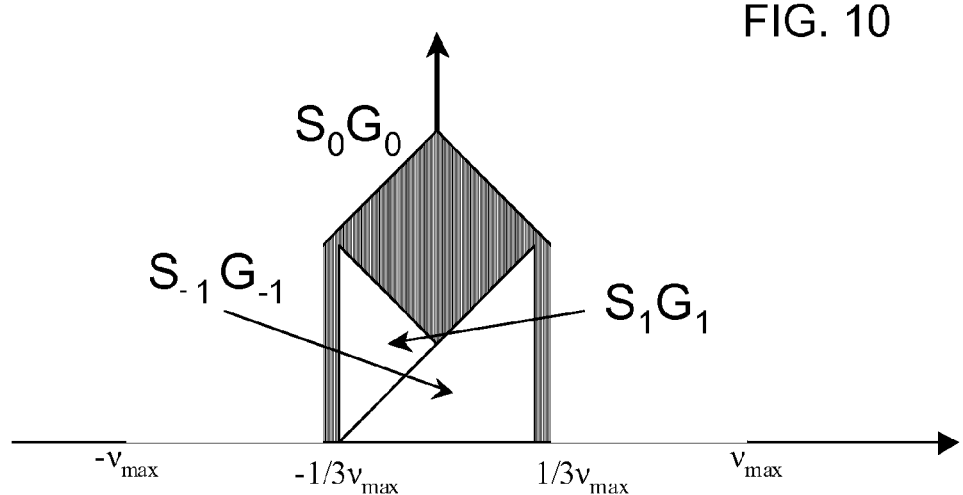
FIG. 11 exemplifies aliasing of the spectrum of an object captured by CCD/CMOS sensor.

In FIG. 11 term $S_1(v) G_1(v)$ is drawn as masking term $S_{-1}(v) G_{-1}(v)$; it should be understood that $S_{-1}(v) G_{-1}(v)$ extends up to $\frac{1}{3} v_{max}$. Keeping in mind that $S_0(v)$ is recovered from the first image, the folded $S_1(v)$ and $S_{-1}(v)$ carrying high resolution information need to be determined from $I_1(v)$ which is:

$I_1(v) = S_{-1}(v) G_{-1}(v) + S_1(v) G_1(v)$ \quad (7)

The grating mask 12 fulfils the orthogonality condition of:

$G_l(v) \cdot G_k(v) = \delta[l,k] l, k \in [-1,1]$ \quad (8)

where $\delta[l,k]$ is Kronicker delta function.

Figure 12:
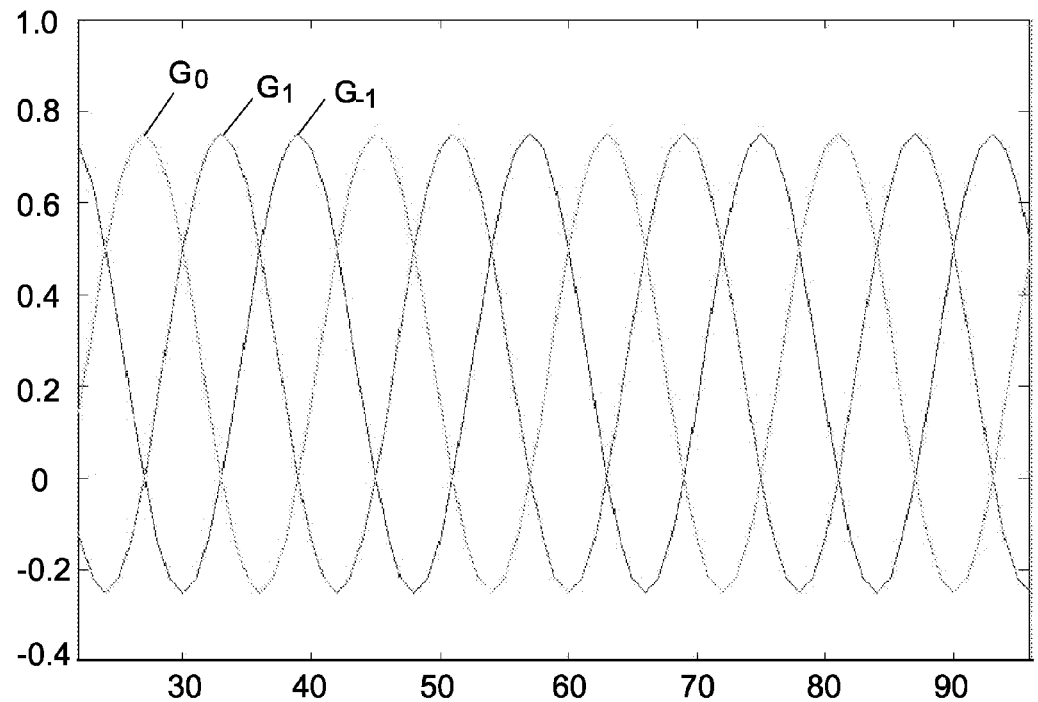
FIG. 12 exemplifies an orthogonal spatial filter in a folded representation.

The mask is illustrated in FIG. 12 in the folded manner: $G_{-1}(v)$ and $G_1(v)$ are folded into a central third part $G_0(v)$. It should be remembered that they should be unfolded for full picture.

Figure 13A:
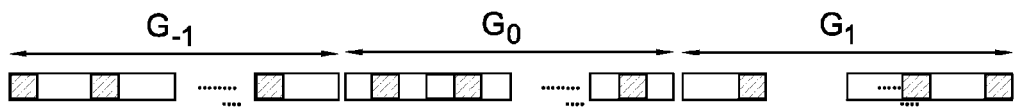
FIGS. 13A-13B illustrate a code of an exemplary orthogonal filter and coding provided by it, respectively.
Figure 13B:
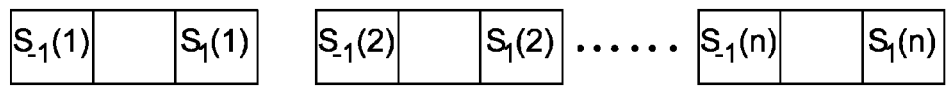

As a result, $I(v)$ can be described as composed of "macro-pixels". Each macro-pixel consists of the contributions of $S_{-1}(v)$ and $S_1(v)$—see FIGS. 13A-13B, wherein FIG. 13A shows an example for orthogonal coding where in each spectral region there is a macro-pixel with a certain non-zero pixel (i.e. transmitting frequency, see also FIG. 4B), FIG. 13B shows that after aliasing all non-zero pixels are folded in a non-overlapping way providing orthogonality ($S_0(v)$ has been determined and subtracted at this stage, therefore central pixel are empty in these macropixels). It should be noted that the periodicity is interrupted in FIG. 13A where $G_{-1}(v)$ and $G_0(v)$ meet and where $G_{-0}(v)$ and $G_1(v)$: there 3 white pixels instead of regular follow in sequence. These interruptions create orthogonality, upon folding.

The high-resolution information is limited by the optical system to ⅓ of field of view. Therefore, it is possible to reconstruct $S_{-1}(v)$ and $S_1(v)$, by taking $I_1(v)$ every third sample and 3-times interpolation.

The 3-times zoomed image $S_{zoom}(v)$ can be now found as:

$S_{zoom}(v) = S^c_0(v) + S_{-1}(v) + S_1(v)$ \quad (9)

and the non-zoomed image $S_{no\ zoom}(v)$ taken with the degraded OTF is simply $S_0(v)$.

Figure 14:
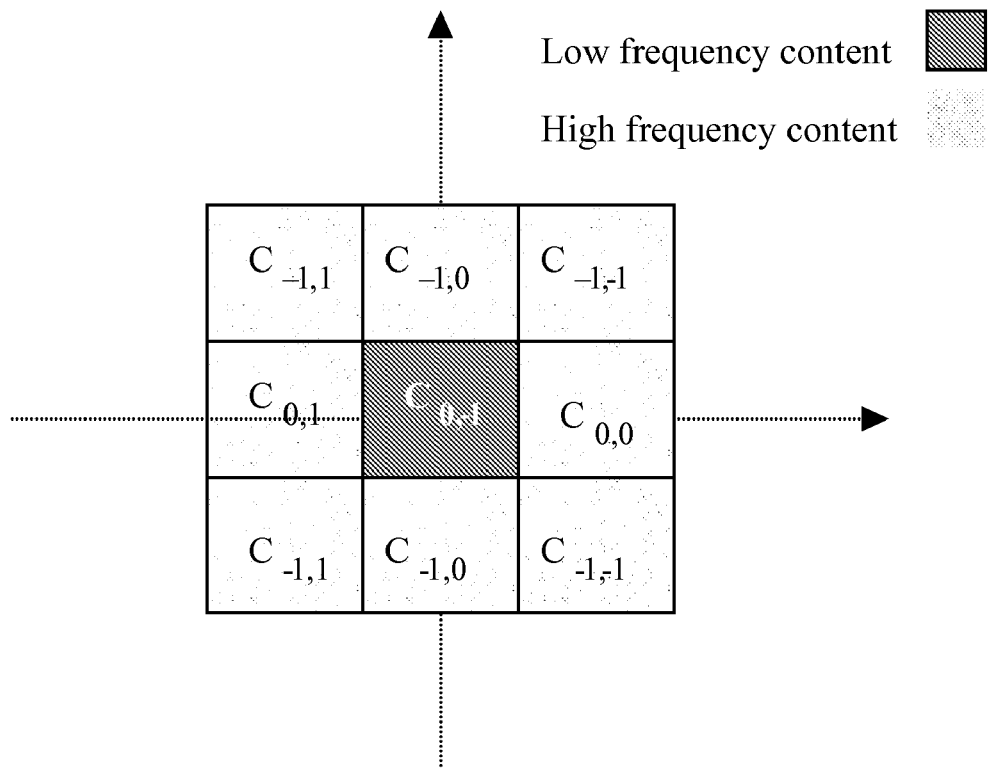
FIG. 14 exemplifies an original image spectrum taken with an open state of the spatial filter.

More specifically, let us consider the extension to 2-D case which is straightforward. The original image spectrum with an open shutter is illustrated in FIG. 14. The Fourier content is virtually divided into nine equal regions $C_{l,k}(V_x, V_y)$, (l, k∈{-1,0,1}.

Figure 15:
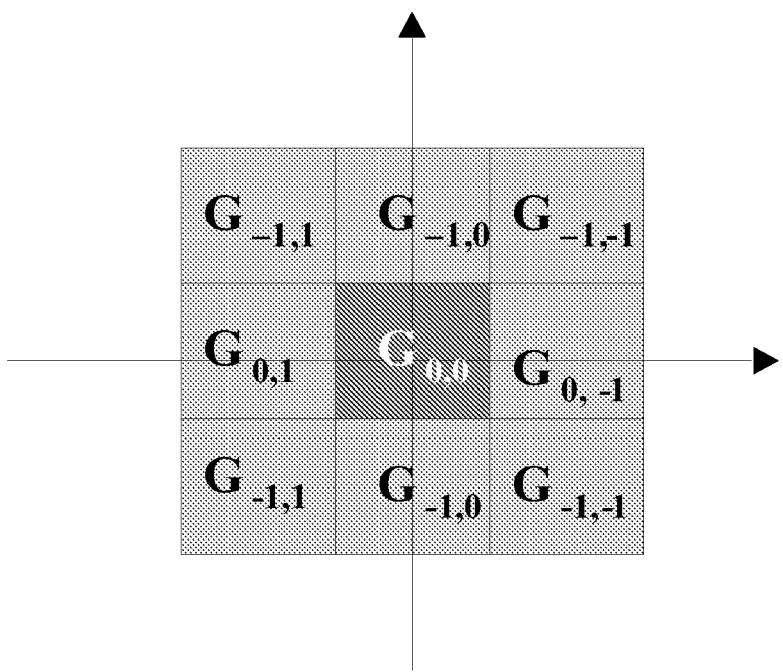
FIG. 15 shows an example of an orthogonal spatial filter (coding grating mask)
Figure 16:
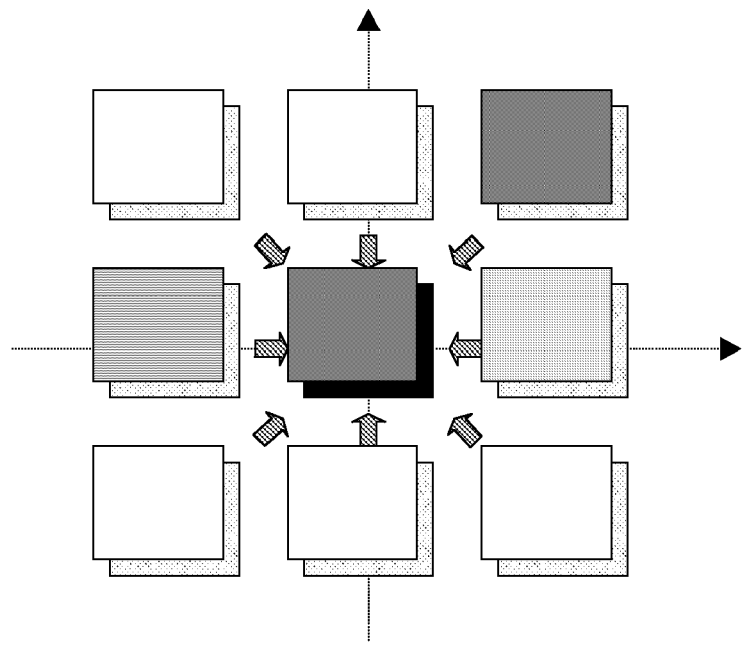
FIG. 16 shows the folding effect of an acquired image (folding of the high frequency content due to the aliasing) taken with the mask of FIG. 15.
Figure 17:
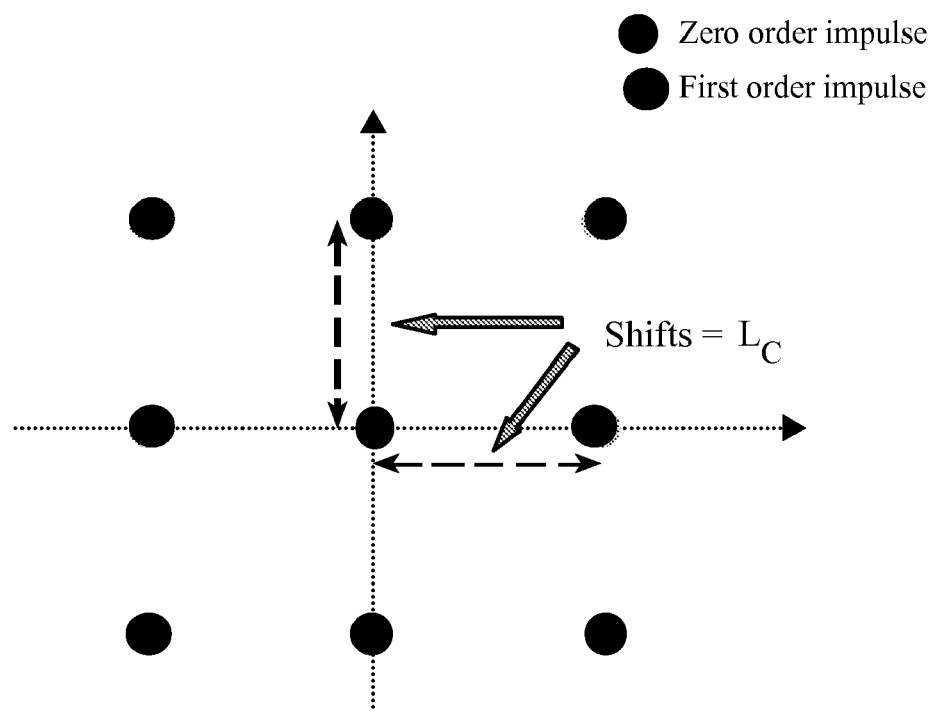
FIG. 17 shows the response of the coding mask of FIG. 15.

The coding grating mask 12 is shown in FIG. 15: it has nine orthogonal regions. The folding effect of an acquired image (folding of the high frequency content due to the aliasing) is shown in FIG. 16. The coding mask $g_0(x,y)$ response is illustrated in FIG. 17.

Figure 18:
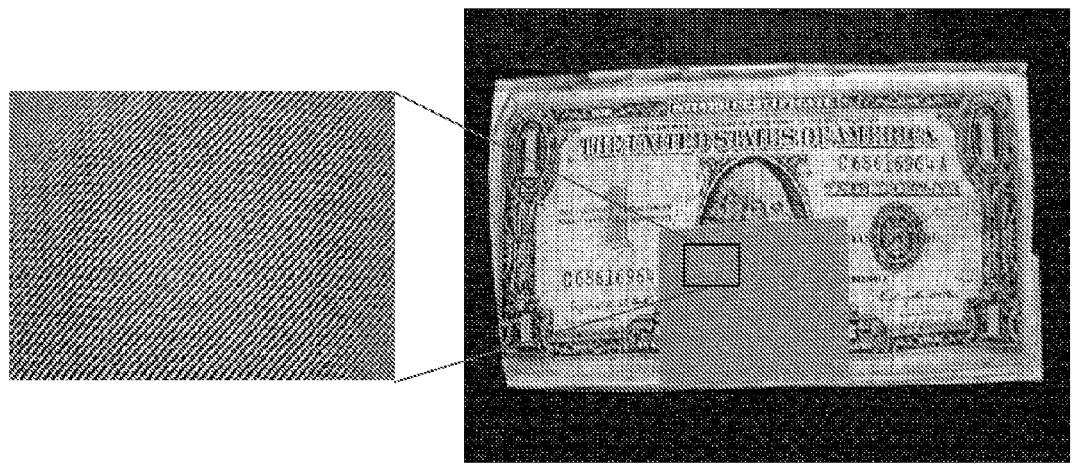
FIG. 18 exemplifies an original image (object) having a barcode pattern 3 times higher then resolving ability of a PDA sensor.
Figure 19:
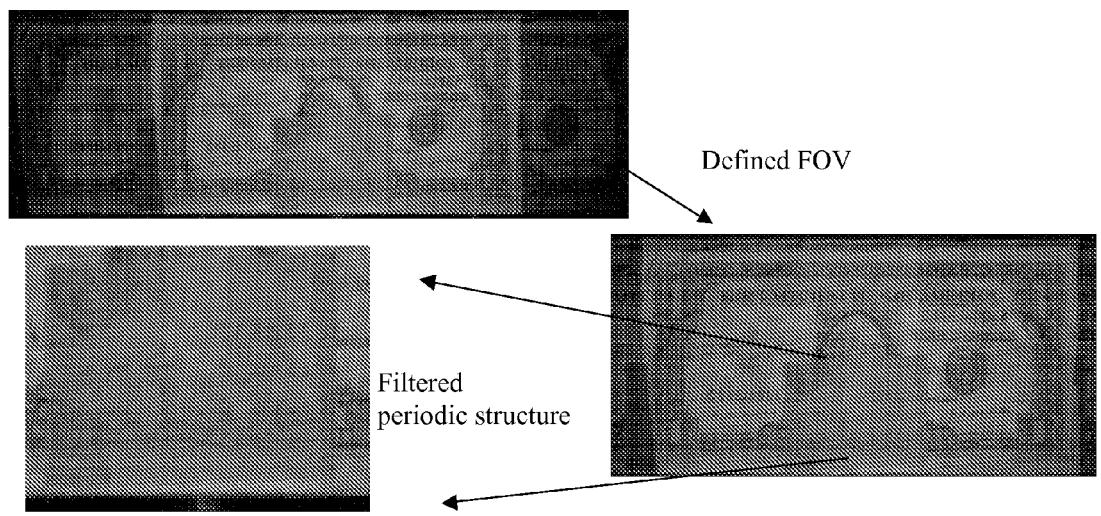
FIG. 19 shows an image of the object of FIG. 18 taken with the semi-closed state of the spatial filter (shutter)
Figure 20:
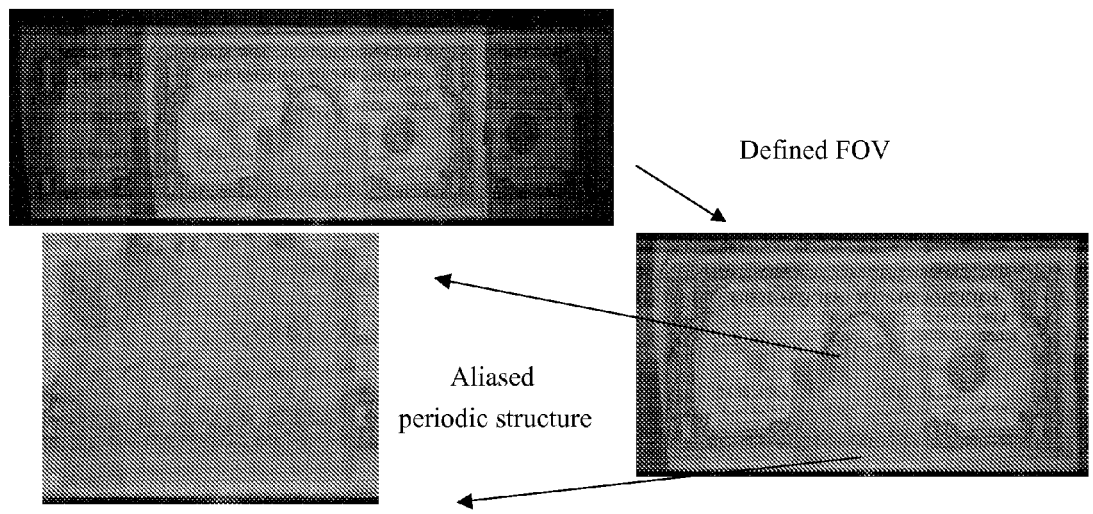
FIG. 20 shows an image of the object of FIG. 18 taken with the open shutter.
Figure 21:
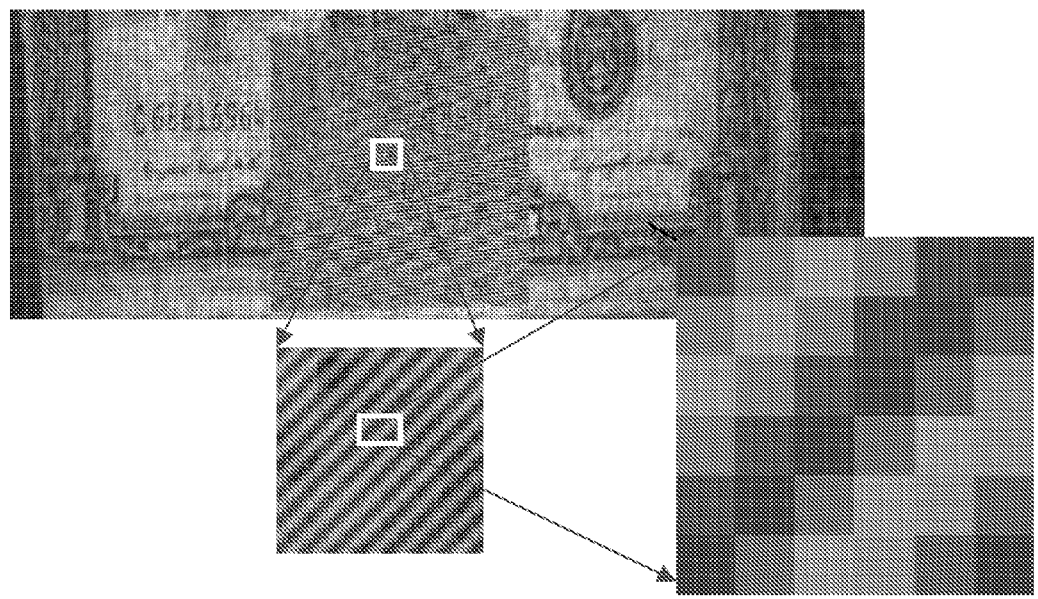
FIG. 21 shows a reconstructed image of the object of FIG. 18.

In the experiment conducted by the inventors using the system of FIG. 2 but with orthogonal filter 12, the OTF was regulated by a shutter (filter 6). FIG. 18 shows the original image (object) which has a barcode pattern 3 times higher then resolving ability of a PDA sensor. FIG. 19 shows an image taken with semi-closed shutter. The periodic structure is low-pass filtered. FIG. 20 shows an image taken with open shutter. The periodic structure is aliased. FIG. 21 shows a reconstructed image. The periodic structure is resolved.

The so-obtained results were verified: Each sensor pixel was a 4.2 microns size (Micron 2M sensor), periodic structure was of a diagonal period of 3.2 microns, restored image of FIG. 21 is on X6 grid—effective pixel of 0.7 microns and diagonal period of ~5 (X6) pixels.

Let us now consider the iris (filter 6) positioned in the intermediate image plane (similar to FIG. 3). Imaging for 3 times zoom is performed without longitudinal movement of the optical elements. Two images are acquired: (1) 3 times cropped field of view; and (2) simple imaging (open shutter). The zoomed image can be reconstructed from the 3-times cropped field of view image. The "simple imaging" is needed for reconstructing the whole field of view. Monochromatic illumination is assumed.

Let us denote $c(x)$ to represent partial $L_C \times L_C$ field of view of an object plane, $C(v)$ to be the Fourier transform of $c(x)$, v being the frequency coordinate belonging to the spectral range of $[-v_{max}, v_{max}]$, where $v_{max}$ is the maximal spatial frequency of $c(x)$ and is inversely related to the spatial resolution $\delta x$ in the object plane. Imaging system passes the high resolution information ($C_{-1}(v)$ and $C_1(v)$) only in the central part $L_C \times L_C$, while the low resolution information $C_0(v)$ is passed by the whole field of view L×L. $C_0(v)$ has two parts: $C_0(v) = C^c_0(v) + C^p_0(v)$, where $C^c_0(v)$ is due to central region $L_C \times L_C$ and $C^p_0(v)$ is due to periphery region.

The Fourier content is virtually divided into three equal regions (compare with FIG. 8):

(a) Left third $C_{-1}(v)$ with $v \in [-v_{max}, -\frac{1}{3} v_{max}]$ (b) Central third $C_0(v)$ with $v \in [-\frac{1}{3} v_{max}, \frac{1}{3} v_{max}]$ (c) Right third $C_1(v)$ with $v \in [\frac{1}{3} v_{max}, v_{max}]$ The grating mask multiplies these spectral components so that orthogonality between the components is created. The coding grating mask also consists of three regions:

(a) Left third $G_{-1}(v)$ with $v \in [-v_{max}, -\frac{1}{3} v_{max}]$
(b) Central third $G_0(v)$ with $v \in [-\frac{1}{3} v_{max}, \frac{1}{3} v_{max}]$
(c) Right third $G_1(v)$ with $v \in [\frac{1}{3} v_{max}, v_{max}]$.

The chosen mask fulfils the orthogonality condition of:

$$G_l(v) \cdot G_k(v) = \delta[l,k] \quad (10)$$

where $\delta[l,k]$ is Kronicker delta function. When the image is under-sampled by the detector, an aliasing effect takes place. The aliasing is a folding of $C_{-1}(v)$ and $C_1(v)$, multiplied by the relevant transfer coefficients, into the central spectral third. The spectrum of the captured image equals to:

$$I(v) = \sum_{k=-1}^{1} C_k(v) \times G_k(v) \quad v \in [-1/3 \, v_{max}, 1/3 \, v_{max}] \quad (11)$$

Figure 22:
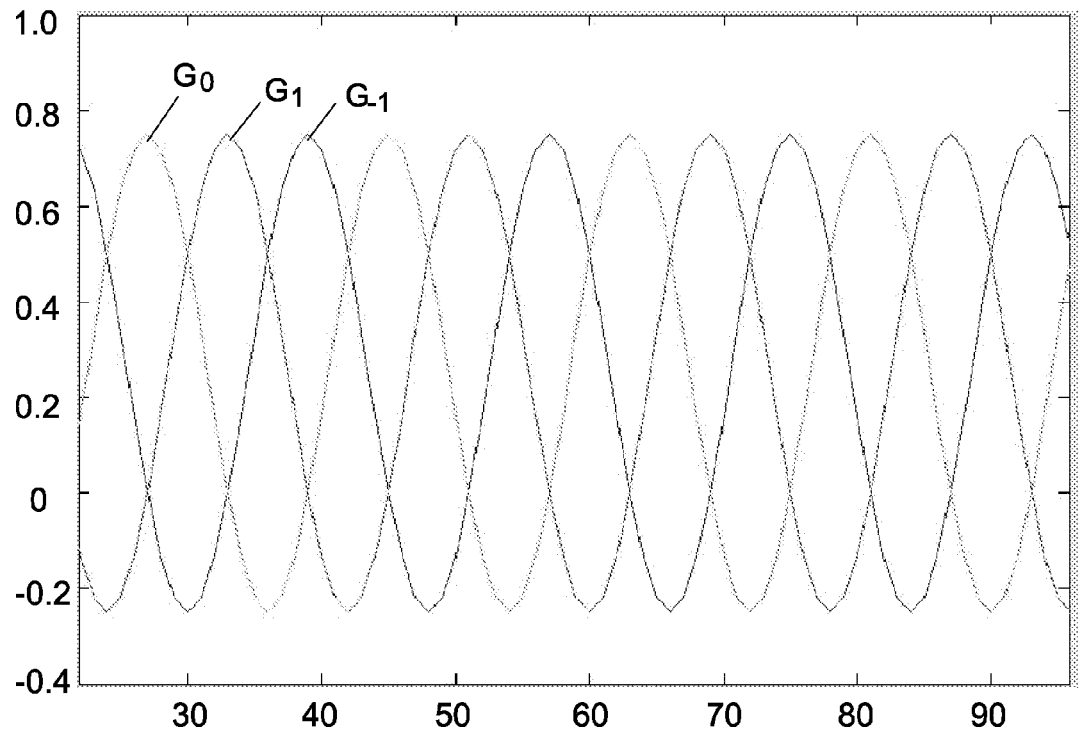
FIG. 22 shows an orthogonal spatial filter (grating) in the folded manner (similar to that of FIG. 12), as used in the experiments.

The grating is illustrated in FIG. 22 in the folded manner. It should be understood that the products $C_{-1}(v) \times G_{-1}(v)$ and $C_1(v) \times G_1(v)$ are folded into the central third part and added to $C_0(v) G_0(v)$.

Figure 23A:
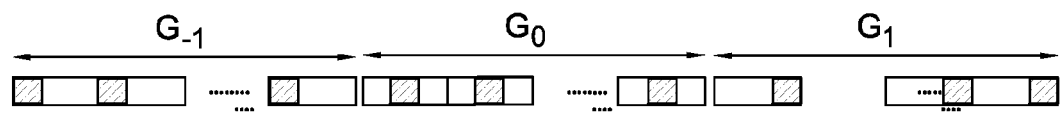
FIG. 23A to 23C illustrate, respectively, a code of an exemplary orthogonal filter of FIG. 22, coding provided by it, and a simulated grating structure.
Figure 23B:
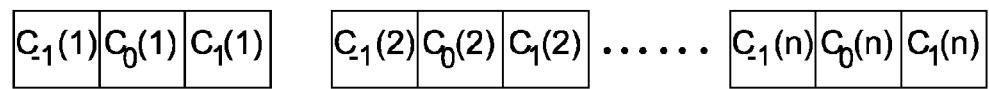
Figure 23C:
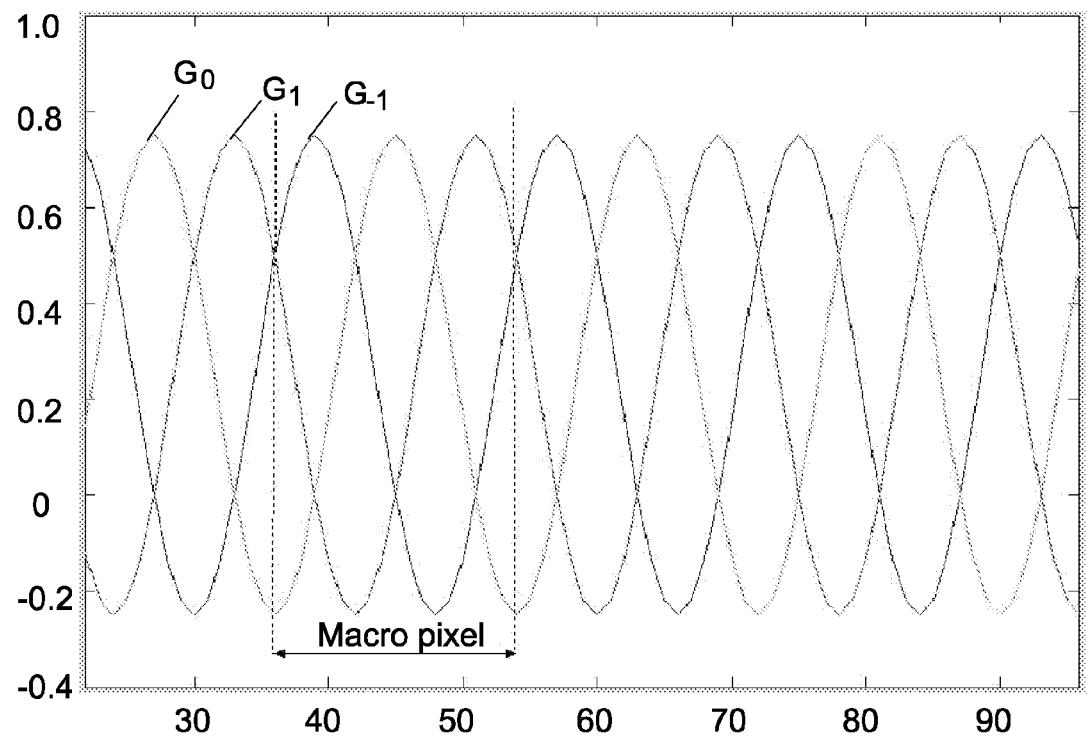

Due to coding, I(v) can be described as composed of "macro-pixels". Each macro-pixel consists of the contributions of $C_{-1}(v)$, $C_1(v)$ and $C_0(v)$—see FIG. 23A-23C, where FIG. 23A is an example for orthogonal coding: in each spectral region there is a macro-pixel with a certain non-zero pixel, FIG. 23B shows that after aliasing all non-zero pixel are folded in a non-overlapping way providing orthogonality, and FIG. 23C shows a simulated grating structure.

The shutter (filter 6) limits the field of view to ⅓. Therefore it is possible to reconstruct $C_k(v)$, by taking its every 3 samples. This way C(v) is reconstructed and therefore c(x), which is 3 times zoomed central part of an object, is seen.

Figure 8:
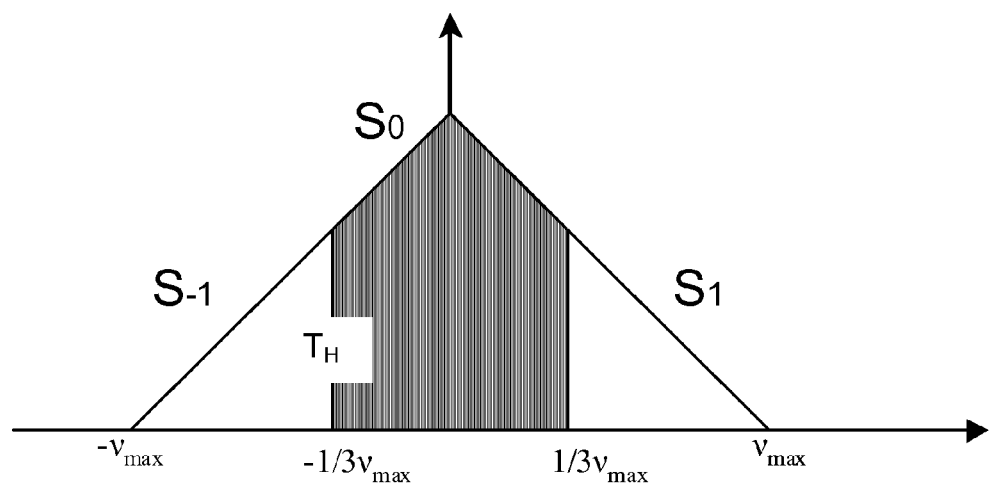
FIG. 8 shows the Fourier content virtually divided into three equal regions.
Figure 24:
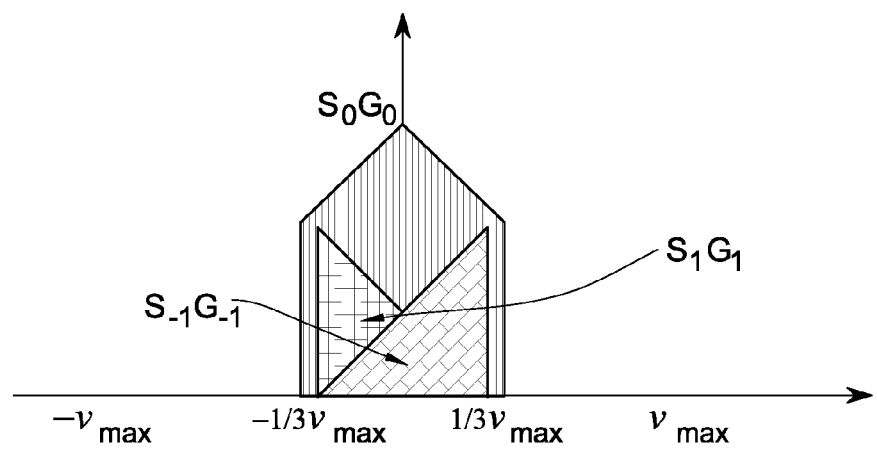
FIG. 24 shows aliasing of the spectrum of an object captured by CCD/CMOS sensor as used in the experiments.

Let us now discuss the reconstruction algorithm for the full field of view. The original spectrum of an object, which is now denoted S(v) and corresponds to C(v) above, is shown in FIG. 8. The spectrum of an object captured by CCD/CMOS sensor is shown in FIG. 24 and is denoted by I(v):

$$I(v) = \sum_{k=-1}^{1} S_k(v) \times G_k(v) \quad v \in [-1/3 \, v_{max}, 1/3 \, v_{max}] \quad (12)$$

Imaging system passes the high resolution information ($S_{-1}(v)$ and $S_1(v)$) in the central part $L_C \times L_C$, and low resolution information $S_0(v)$ is passed from the whole field of view $L \times L$. $S_0(v)$ has two parts: $S_0(v) = S^c_0(v) + S^p_0(v)$: $S^c_0(v)$ due to the central region $L_C \times L_C$ and $S^p_0(v)$ due to the periphery region. In the description above, S(v) described a spectrum of a central part of an object. Now, the next relationship can be established: $S(v) = S^p_0(v) + S_{-1}(v) + S_1(v)$. By acquiring an image with a 3-times cropped filed of view, the high resolution information of S(v) is determined, and the full S(v) is recovered by taking another image with the open shutter 6. $I_0(v)$ is determined as $$I_0(v) = I(v) - S_{-1}(v) G_{-1}(v) - S_1(v) G_1(v) \quad (13)$$

and is expressed in the spatial domain as a convolution:

$$i_0(x) = (s_0 * g_0)(x) \cdot rect\left(\frac{x}{L}\right) \quad (14)$$

where $s_0$ and $g_0$ are the inverse Fourier transforms of $S_0(v)$ and $G_0(v)$, respectively, and rect (x/L) is defined as:

$$rect\left(\frac{x}{L}\right) = \begin{cases} 1 & |x| < L/2 \\ 0 & \text{otherwise} \end{cases} \quad (15)$$

As for the code used, a number of replicas for the central Nyquist band remains the same (3) as in the previously described example, the above equations (3)-(5) can be used here as well, and $G_0(v)$ remains the same allowing reconstruction of the relevant incoming light harmonics.

Figure 25A:
FIGS. 25A to 25C illustrate the simulation results.
Figure 25B:
Figure 25C:
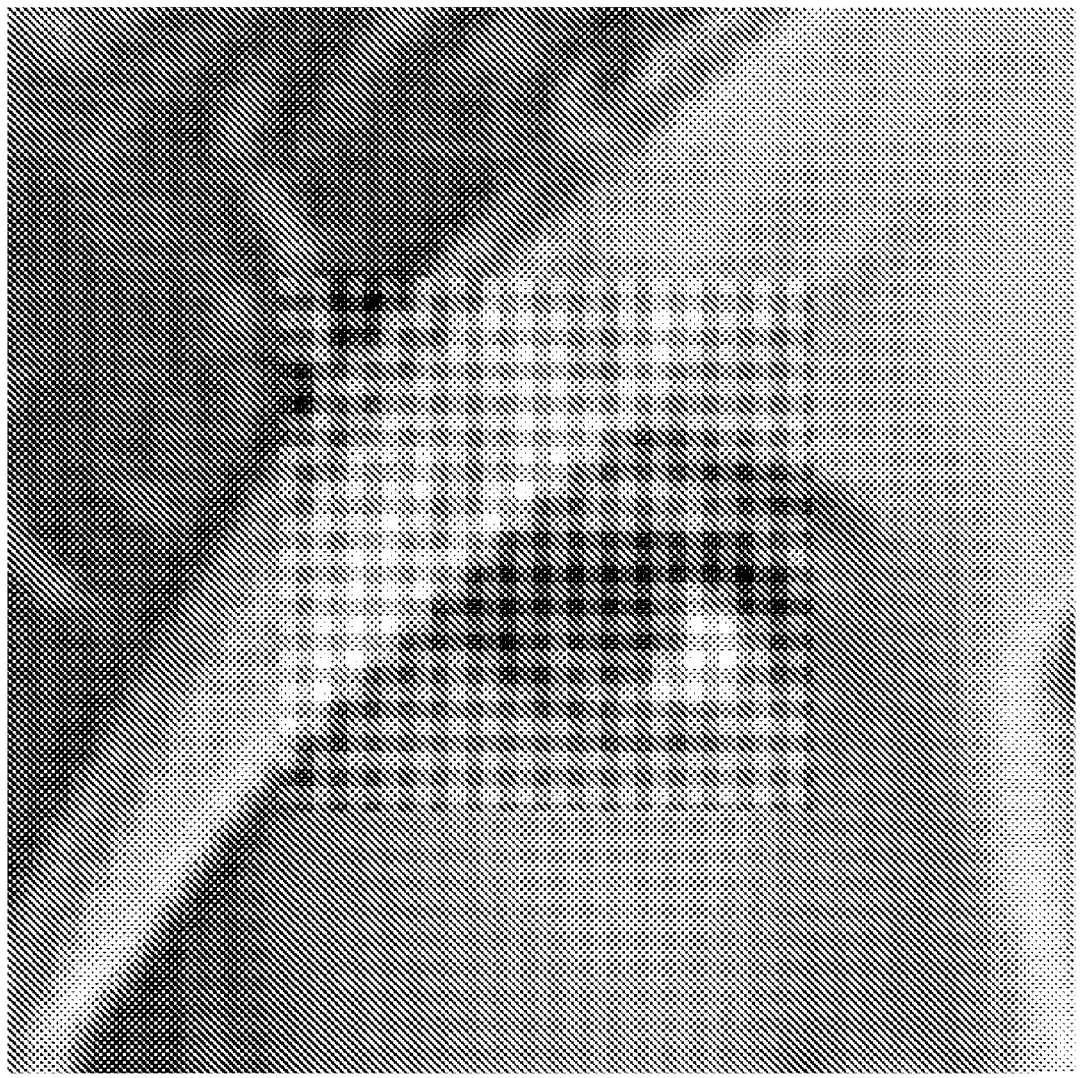

FIGS. 25A-25C illustrate the simulation results: FIG. 25A shows an original image (object) having the barcode pattern 3 times higher than resolving ability of a sensor; FIG. 25B shows the central region of an image captured by the sensor with resolving ability 3 times lower than the barcode pattern; and FIG. 25C shows 3-times zoomed image obtained using the above technique (with switchable filter) with the same sensor.

As shown above, the 3-times zooming (M=3) can be obtained with acquisition of two images (frames) only, irrespective of whether the switchable filter 6 is located in the spectral plane of the system, i.e. at the entrance pupil/aperture/stop/exit pupil (e.g. FIG. 2) or in the intermediate image plane (FIG. 3) and when in the spectral plane irrespective of whether an OSF 12 or POSF 11 is used.

As will be exemplified below, the inventors have found that when operating with an OSF, an M-times zooming with M>3 can be obtained using acquisition of two frames only, irrespective of whether a switchable filter 6 is in the intermediate image plane (FIG. 3), or is at the spectral plane of the system.

As for the operation with the a switchable filter 6 at the spectral plane, the number of frames required for M-times zooming with M>3 depends on a degree of orthogonality of an orthogonal spatial filter (11 in FIG. 2): the lower the degree of orthogonality the higher number of frames in needed. This is because the degree of orthogonality actually depends on a number of aliasing Nyquist bands involved (passed by the optics). An orthogonal spatial filter might no longer be orthogonal when an additional aliasing Nyquist band is passed by the optics. In fact, this additional aliasing Nyquist band might fold into that or those frequency(ies) which is/are already occupies by aliased original Nyquist band(s). Accordingly, the orthogonal spatial filter has a certain degree of orthogonality with respect to the number of Nyquist bands involved: decrease in the degree of orthogonality could be compensated by increase in the number of acquired frames with different states of switchable spatial frequency filter. By setting the cut off frequency of the switchable spatial frequency filter at a lowest frequency of the additional Nyquist band, and acquiring an image at this state of the switchable spatial frequency filter, it can be identified (by processing) whether the aliased features in the captured image have been folded from the additional Nyquist band or not. This processing may be repeated for one or more times, until reconstructing the object.

Also, the operation with two switchable filters, one at the spectral plane and the other at the intermediate image plane allows for M-times zooming, M>3, irrespective of whether OSF or POSF is used. In this case the above described processing technique can be used.

It should also be understood that the use of orthogonal spatial filters with lower degree of orthgonality allows for receiving less noisy reconstructed images. This is because such orthogonal spatial filters with lower degree of orthgonality sample spectral space more frequently. Accordingly, there is a certain trade-in between noise and the number of frames to be taken.

Let us consider the use of an imaging system of FIG. 3, i.e. an OSF 12 and a switchable filter 6 is in the intermediate image plane, and aiming at M-times zooming with M>3, e.g. M=5.

Figure 26:
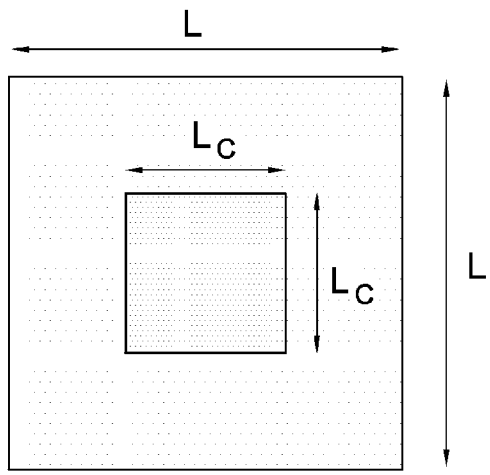
FIG. 26 shows an image plane with an aliasing window in a central part thereof.

FIG. 26 shows an image plane with an aliasing window in a central part ($L_C \times L_C$) thereof. It is assumed that the optical throughput is M times higher in the central region than in the periphery region, and that the optical resolution is M-times smaller in the aliasing window than the geometrical resolution. This means that the Nyquist frequency is M times lower than the optical imaging system throughput bandwidth. If this is not fulfilled, that is non-natural zoom factor is desired, optical imaging system throughput bandwidth can be extended, if optics permits so, to a closest natural value, or a code can be selected for an orthogonal filter (e.g. grating mask) to reduce noise.

The orthogonal filter 12 may for example be placed in the spectral plane (entrance pupil/aperture/stop/exit pupil plane) of an imaging system. In this case, the filter 12 has effect of spatial replication. It is possible to locate the filter 12 near the spectral plane, in which case the filter's dimensions are scaled.

The switchable filter 6 (shutter), placed in an intermediate image plane, may for example have two states: (a) open: L×L and (b) semi-open: $L_C \times L_C$ ($L > L_C$), corresponding to respectively, operation without and with zoom. In some cases, $L \geq M \cdot L_C$. Two images are acquired: one with the semi-open state of the filter 6 and one with the open state of said filter. This allows for reconstructing zoomed-in and zoomed-out representations of the object.

Let us assume that M=5. The analysis is 1-D, and it is straightforward extended to 2-D. Let us denote s(x) to represent total L×L field of view of an object plane, S(v) to be the Fourier transform of s(x), with v being the frequency coordinate belonging to the spectral range of $[-v_{max}, v_{max}]$, where v max is the maximal spatial frequency of the object, and is inversely related to the spatial resolution δx in the object plane. Such details can be seen only in the zoom field since they are M times finer than a sensor Nyquist frequency $v_{Ny}^{sensor}$: $2v_{max} = M v_{Ny}^{sensor}$ Imaging system passes the high resolution information $S_{-2}(v)$, $S_{-1}(v)$, $S_1(v)$ and $S_2(v)$ in the central part $L_C \times L_C$. Low resolution information $S_0(v)$ exists in the whole field of view L×L. $S_0(v)$ itself is comprised of two parts: $S_0(v) = S^c_0(v) + S^p_0(v)$: $S^c_0(v)$ is due to the central region $L_C \times L_C$ and $S^p_0(v)$ is due to the periphery region. The Fourier content is virtually divided into five equal regions (FIG. 27):

a) Most left part $S_{-2}(v)$ with $v \in [-v_{max}, -(0.5+1)v_{Ny}^{sensor}]$
b) Left part $S_{-1}(v)$ with $v \in [-(0.5+1)v_{Ny}^{sensor}, -0.5v_{Ny}^{sensor}]$
c) Central part $S_0(v)$ with $v \in [-0.5v_{Ny}^{sensor}, 0.5v_{Ny}^{sensor}]$
d) Right part $S_1(v)$ with $v \in [0.5v_{Ny}^{sensor}, (0.5+1)v_{Ny}^{sensor}]$.
e) Most right part $S_2(v)$ with $v \in [(0.5+1)v_{Ny}^{sensor}, v_{max}]$.

Figure 28:
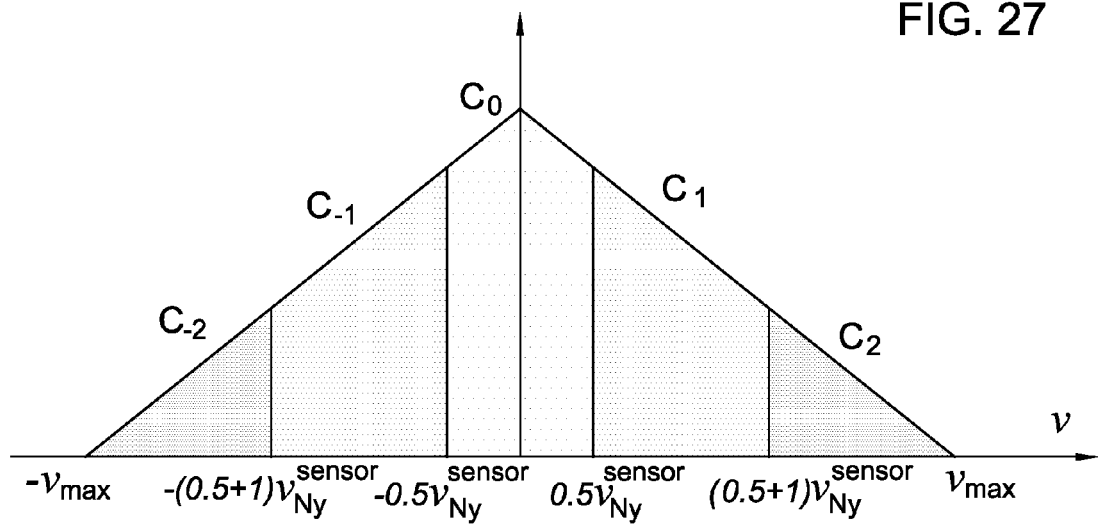

Let us denote c(x) to represent central $L_C \times L_C$ field of view of an object plane, and C(v) to represent the Fourier transform of the object c(x), with v being the frequency coordinate belonging to the spectral range of $[-v_{max}, v_{max}]$, where $v_{max}$ is the maximal spatial frequency of the object and is inversely related to the spatial resolution δx in the object plane. The Fourier content is virtually divided into 5 equal regions (FIG. 28):

a) Most left part $C_{-2}(v)$ with $v \in [-v_{max}, -(0.5+1)v_{Ny}^{sensor}]$
b) Left part $C_{-1}(v)$ with $v \in [-(0.5+1)v_{Ny}^{sensor}, -0.5v_{Ny}^{sensor}]$
c) Central part $C_0(v)$ with $v \in [-0.5v_{Ny}^{sensor}, 0.5v_{Ny}^{sensor}]$
d) Right part $C_1(v)$ with $v \in [0.5v_{Ny}^{sensor}, (0.5+1)v_{Ny}^{sensor}]$.
e) Most right part $C_2(v)$ with $v \in [(0.5+1)v_{Ny}^{sensor}, v_{max}]$.

The orthogonal filter (e.g. grating mask) 12 multiplies these spectral components so that orthogonality between the components is created. The coding grating mask also consists of M (5) regions:

a) Most left part $G_{-2}(v)$ with $v \in [-v_{max}, -(0.5+1)v_{Ny}^{sensor}]$
b) Left part $G_{-1}(v)$ with $v \in [-(0.5+1)v_{Ny}^{sensor}, -0.5v_{Ny}^{sensor}]$
c) Central part $G_0(v)$ with $v \in [-0.5v_{Ny}^{sensor}, 0.5v_{Ny}^{sensor}]$
d) Right part $G_1(v)$ with $v \in [0.5v_{Ny}^{sensor}, (0.5+1)v_{Ny}^{sensor}]$.
e) Most right part $G_2(v)$ with $v \in [(0.5+1)v_{Ny}^{sensor}, v_{max}]$.

The chosen mask fulfils the orthogonality condition of:

$$G_l(v) \cdot G_k(v) = \delta[l,k] \quad (16)$$

where δ[l,k] is Kronicker delta function.

The mask is described in FIGS. 29A-29C exemplifying the orthogonal coding and corresponding macro pixels: in each spectral region there is a macro-pixel with a certain non-zero pixel (FIG. 29A), an opaque-transparent mask provides orthogonality between high frequency bands ($G_{-1}$ and $G_{-2}$; $G_1$ and $G_2$)—FIG. 29B, and after aliasing (folding) all non-zero pixel are folded in a non-overlapping way, providing orthogonality (FIG. 29C). More specifically, the mask is made of two parts: one shown in FIG. 29A and the second one (opaque-transparent—"dashed lines") is added in FIG. 29B. It should be noted that this structure is for M=5. For higher zoom factors the part described at FIG. 29A is enlarged repeatedly: $G_2(v)$ and $G_1(v)$ are similar there, the added opaque transparent mask at FIG. 29B will be different, providing orthogonality.

When the image is under-sampled by the detector, an aliasing effect takes place. In fact, the aliasing is a folding of $C_2(v)$, $C_1(v)$, $C_{-1}(v)$ and $C_{-2}(v)$ into a central spectral part. Therefore, the spectrum of the captured image equals to:

$$I(v) = \sum_{k=-2}^{2} C_k(v) \times G_k(v) \quad v \in [-0.5 v_{Ny}^{sensor}, 0.5 v_{max}^{sensor}] \quad (17)$$

I(v) can be described as composed of two types "macro-pixels". Each macro-pixel has the contributions of $C_{-1}(v)$, $C_1(v)$ and $C_0(v)$ for one type; $C_{-2}(v)$, $C_2(v)$ and $C_0(v)$ for another.

The shutter 6 limits the field of view to 1/(M+1). Therefore, it is possible to reconstruct $C_k(v)$ (k=±1, ±2 . . . . ±M), by taking its every M+1 sample. This way, C(v) is reconstructed and therefore c(x), thus M-times zoomed central part of an object is seen.

Figure 27:
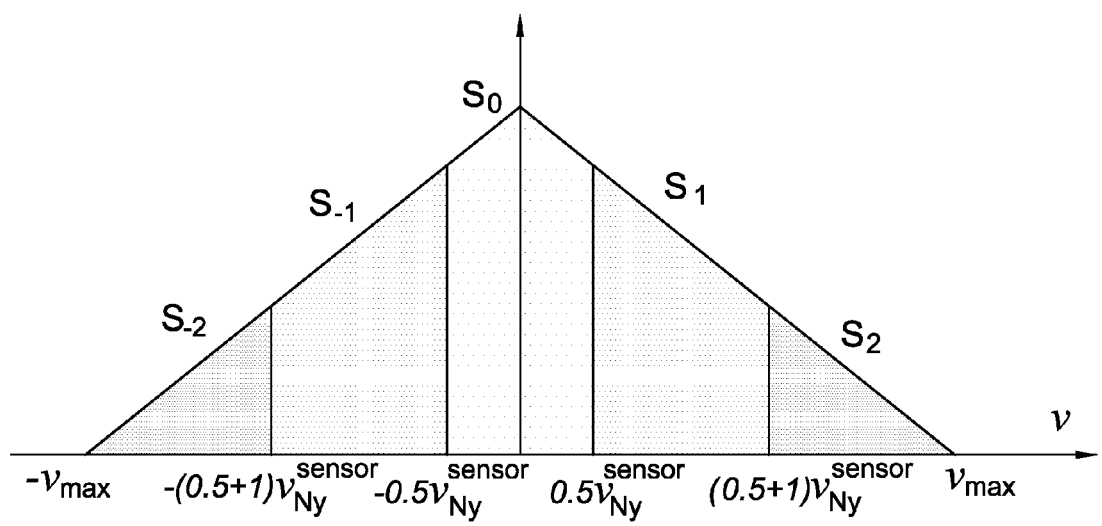
FIGS. 27 and 28 show two examples, respectively, of the Fourier content of an object coming to the PDA.

Let us now consider reconstruction of the total field of view from the second image (frame) with no zoom. The original spectrum of an object is shown in FIG. 27. The spectrum of an object captured by CCD/CMOS sensor is shown in FIG. 30 and is denoted by I(v):

$$I(v) = \sum_{k=-2}^{2} S_k(v) \times G_k(v) \quad v \in [-0.5 v_{Ny}^{sensor}, 0.5 v_{max}^{sensor}] \quad (18)$$

Imaging system passes the high resolution information $S_{-2}(v)$, $S_{-1}(v)$, $S_1(v)$ and $S_2(v)$ in the central part $L_C \times L_C$. Low resolution information $S_0(v)$ exists in the whole field of view $L \times L$. $S_0(v)$ is comprised of two parts: $S_0(v) = S^c_0(v) + S^p_0(v)$, where $S^c_0(v)$ is due to the central region $L_C \times L_C$ and $S^p_0(v)$ is due to the periphery region. In the description above, part $C(v)$ described a spectrum of the central part of an object.

Now the next relationship, $C(v) = S^c_0(v) + S_{-1}(v) + S_1(v) + S_{-2}(v) + S_2(v)$, has been established. This means that by taking zoom image the high resolution information of $S(v)$ is acquired. It is possible then to recover the full field of view $S(v)$ by taking another image with the open shutter (no zoom).

Let us denote $I_0(v)$ as $$I_0(v) = I(v) - \sum_{k=-2, k \neq 0}^{2} S_k(v) \times G_k(v) \quad (19)$$

Here again, for the selected code, functions $g_0$ and $G_0$ remain the same as described above, and thus s0 and S0 can be reconstructed as described above.

Let us now discuss the case when M-time zooming with M>3, e.g. M=5, is required, and the system of FIG. 2 (i.e. the switchable filter is in the spectral plane) is used but with OSF 12. The latter may for example be in the spectral plane (entrance pupil/aperture/stop/exit pupil plane) of the imaging system.

Similarly to the above described examples, an aliasing window is in the central part $L_C \times L_C$ of the image plane (see FIG. 26) and the optical resolution is M times higher in the central part than in the periphery region.

As also described above, a non-degraded OTF provides the throughput of imaging system M times of a resolving ability of a sensor, and degraded OTF provides the throughput of imaging system equal to a resolving ability of a sensor. Assuming the shutter 6 has two states, open (in which case the OTF is non-degraded), and semi-open (in which case the OTF is degraded), two images are obtained while in these two states of the shutter. Final images are created using post-processing.

Imaging system passes the high resolution information $(S_{-1}(v)$ and $S_1(v))$ in the central part $L_C \times L_C$, where $S(v)$ is the Fourier transform of the object function $s(x)$, $v$ is the frequency coordinate belonging to the spectral range of $[-v_{max}, v_{max}]$, $v_{max}$ being the maximal spatial frequency of the object inversely related to the spatial resolution $\delta x$ in the object plane. Low resolution information $S_0(v)$ exists in the whole field of view $L \times L$; $S_0(v)$ is comprised of 2 parts: $S_0(v) = S^c_0(v) + S^p_0(v)$, where $S^c_0(v)$ is due to the central region $L_C \times L_C$ and $S^p_0(v)$ is due to the periphery region.

Virtually dividing the Fourier content into five equal regions (see FIG. 27), we have:
f) Most left part $S_{-2}(v)$ with $v \in [-v_{max}, -(0.5+1)v_{Ny}^{sensor}]$
g) Left part $S_{-1}(v)$ with $v \in [-(0.5+1)v_{Ny}^{sensor}, -0.5v_{Ny}^{sensor}]$
h) Central part $S_0(v)$ with $v \in [-0.5v_{Ny}^{sensor}, 0.5v_{Ny}^{sensor}]$
i) Right part $S_1(v)$ with $v \in [0.5v_{Ny}^{sensor}, (+5+1)v_{Ny}^{sensor}]$.
j) Most right part $S_2(v)$ with $v \in [(0.5+1)v_{Ny}^{sensor}, v_{max}]$.

The orthogonal filter 12 multiplies these spectral components so that orthogonality between the components is created. The filter also consists of M (5) regions:
f) Most left part $G_{-2}(v)$ with $v \in [-v_{max}, -(0.5+1)v_{Ny}^{sensor}]$
g) Left part $G_{-1}(v)$ with $v \in [-(0.5+1)v_{Ny}^{sensor}, -0.5v_{Ny}^{sensor}]$
h) Central part $G_0(v)$ with $v \in [-0.5v_{Ny}^{sensor}, 0.5v_{Ny}^{sensor}]$
i) Right part $G_1(v)$ with $v \in [0.5v_{Ny}^{sensor}, (+5+1)v_{Ny}^{sensor}]$.
j) Most right part $G_2(v)$ with $v \in [(0.5+1)v_{Ny}^{sensor}, v_{max}]$.

Figure 31:
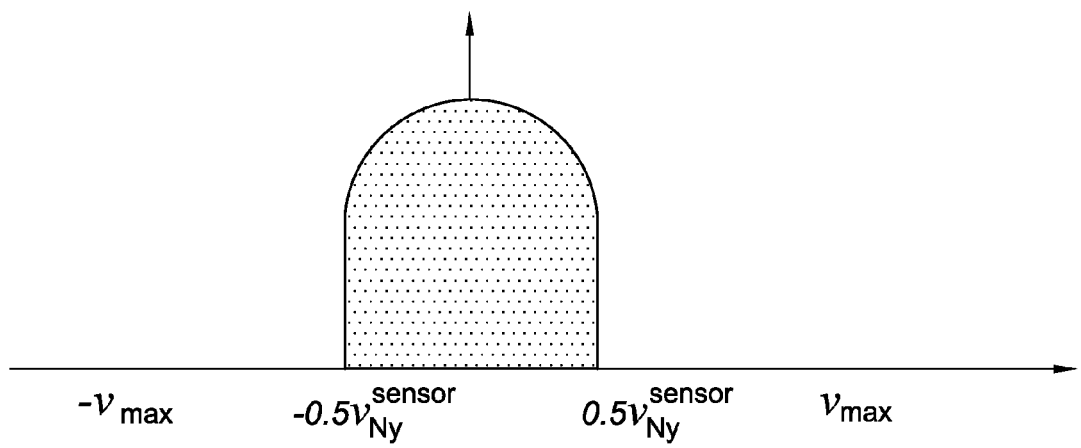
FIGS. 31 and 32 exemplify a change of the OTF degradation due to the effect of the spatial frequency filter.

The imaging system has a degraded OTF limited to $v_{max}$ (see FIG. 31). Thus high-resolution information content $(S_1(v)$ and $S_{-1}(v))$ is blocked.

The spectrum of an object captured by CCD/CMOS is determined as described above, since the code in the central Nyquist band remains the same.

After processing the first image and obtaining $S_0(v)$, a high-resolution information $S_1(v)$ and $S_{-1}(v)$ is to be reconstructed.

Figure 32:
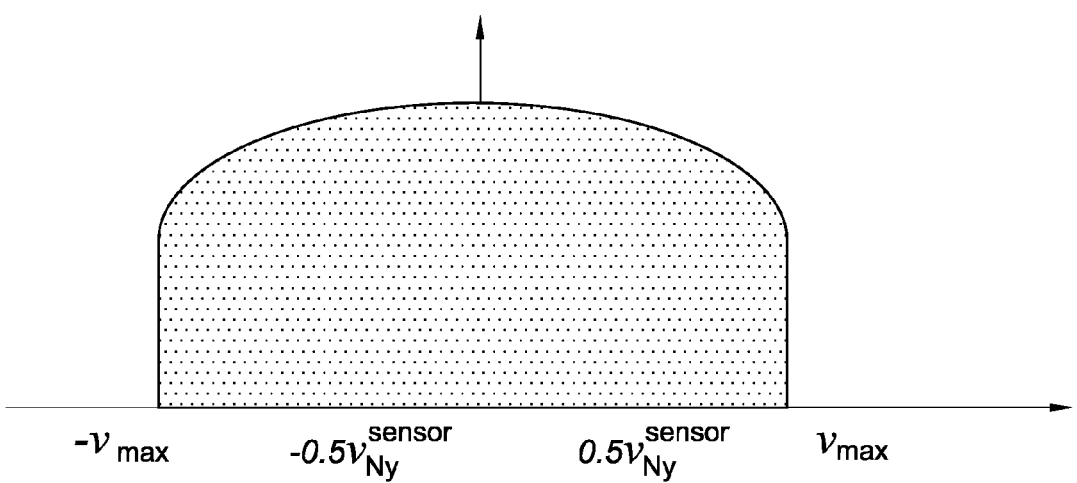
Figure 33:
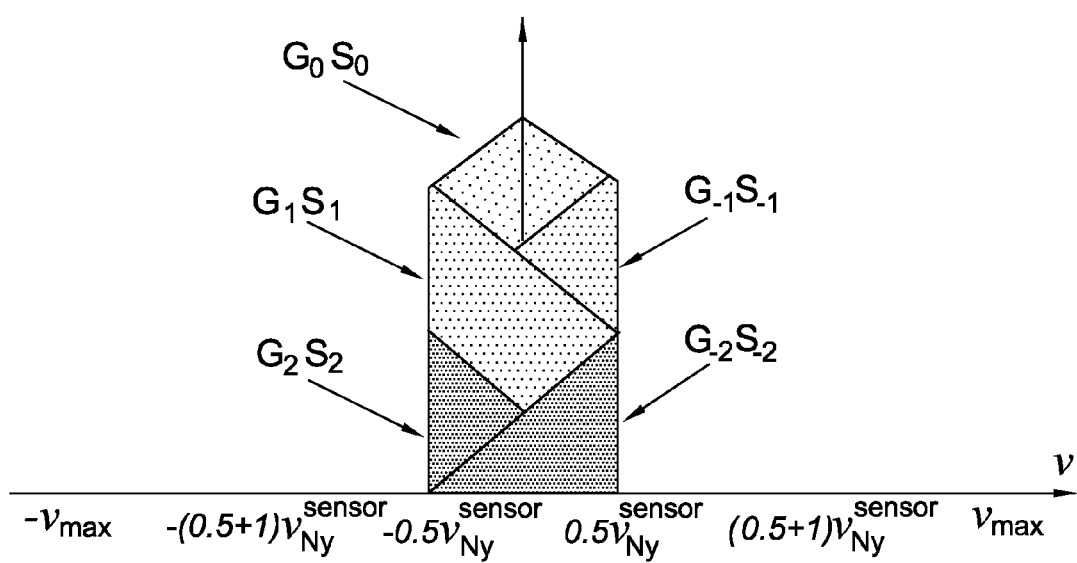
FIG. 33 illustrates aliasing of 2 aliasing Nyquist bands into the central Nyquist band.

The OTF for the second image (with the open state of the shutter 6) is not degraded and is illustrated in FIG. 32. Hence, the captured image will undergo an aliasing. The spectrum of an object captured by CCD/CMOS sensor is shown in FIG. 33 and is denoted by $I(v)$:

$$I(v) = \sum_{k=-2}^{2} S_k(v) \times G_k(v) \quad v \in [-0.5 v_{Ny}^{sensor}, 0.5 v_{Ny}^{sensor}] \quad (20)$$

When the image is under-sampled by the detector, an aliasing effect takes place, which is folding of $S_{-2}(v)$, $S_{-1}(v)$, $S_1(v)$ and $S_2(v)$, into the central spectral part. Therefore, the spectrum of the captured image equals to:

$$I(v) = \sum_{k=-2}^{2} S_k(v) \times G_k(v) \quad v \in [-0.5 v_{Ny}^{sensor}, 0.5 v_{Ny}^{sensor}] \quad (21)$$

Keeping in mind that $S_0(v)$ is recovered from the first image, we have now to separate the folded $S_1(v)$, $S_{-1}(v)$, $S_2(v)$ and $S_{-2}(v)$ high resolution information. $I_1(v)$ is determined as:

$$I_1(v) = \sum_{\substack{k=-2 \\ k \neq 0}}^{2} S_k(v) \times G_k(v) \quad (22)$$

The grating mask fulfils the orthogonality condition of:

$$G_l(v) \cdot G_k(v) = \delta[l, k] \, l, k \in [-1, 1] \quad (23)$$

where $\delta[l, k]$ is Kronicker delta function.

Figure 34A:
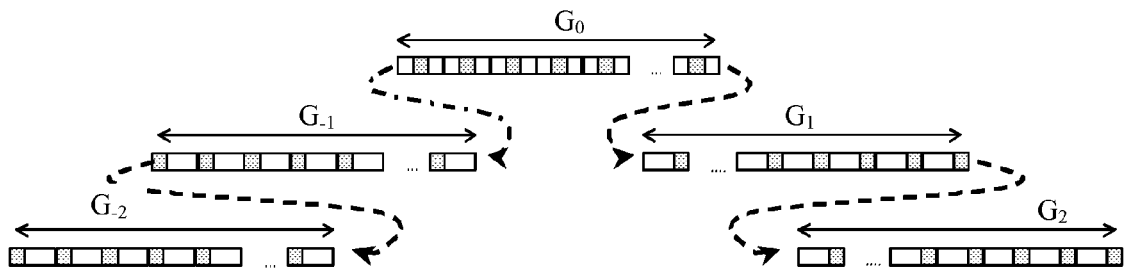
FIG. 34 show, respectively, an example of partially orthogonal coding, an example of orthogonal regionally uniform coding, and macro-pixels obtained by imaging with the orthogonal regionally uniform code.
Figure 34B:
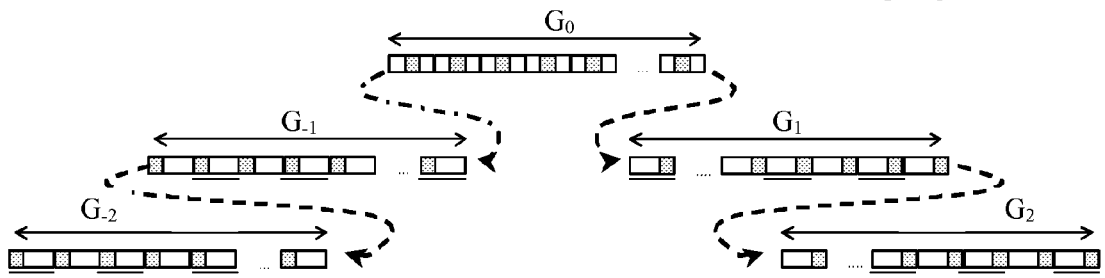
Figure 34C:
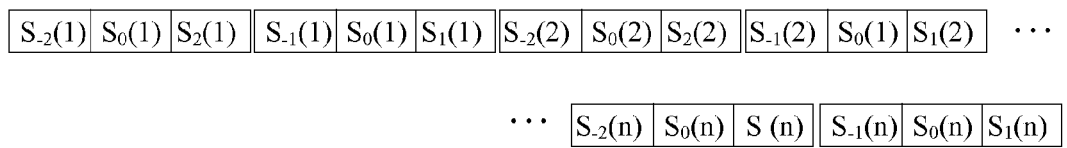

$I(v)$ can be described as composed of two types of alternating "macro-pixels", each macro-pixel consisting of the contributions of $S_{-1}(v)$, $S_1(v)$ and $S_0(v)$ for one type, and $S_{-2}(v)$, $S_2(v)$ and $S_0(v)$ for another. In this connection, reference is made to FIG. 34A-34C, showing that in each spectral region there is a macro-pixel with a certain non-zero pixel (FIG. 34A), an opaque-transparent mask provides orthogonality between high frequencies $G_{-1}$ and $G_{-2}$; $G_1$ and $G_2$ (FIG. 34B), and after aliasing (folding) all non-zero pixel are folded in a non-overlapping way, providing orthogonality (FIG. 34C).

The high-resolution information is limited by the optical system to 1/(M+1) of field of view. Therefore it is possible to reconstruct $S_k(v)$ (k=±1, ±2, ... ±M) by taking $I_1(v)$ every M+1 sample and (M+1)-times interpolation.

The M-times zoomed image $S_{zoom}(v)$ can be now found as:

$$S_{zoom}(v) = S_0^C(v) + \sum_{k=-2, k \neq 0}^{2} S_k(v) \tag{24}$$

The non-zoomed image $S_{no\ zoom}(v)$ is simply $S_0(v)$.

Let us now consider M-times zooming, M>3 (e.g. M=5, 7, 9, ...) using the imaging system of FIG. 2 (i.e. the switchable filter 6 in the spectral plane) and a partially orthogonal spatial filter (e.g. grating mask) 11 of a certain degree of orthogonality, by acquiring k frames.

As indicated above, we assume that an aliasing window is located in the central part $L_C \times L_C$ of the image plane (see FIG. 26) and the throughput resolution is M times higher in the central part than in the periphery region. As indicated above, $L>L_C$. In the present example, $L=3\ L_C$. The partially orthogonal spatial filter 11 is for example located in the spectral plane (entrance pupil/aperture/stop/exit pupil plane) of the imaging system, and thus has effect of spatial replication.

Filter (shutter) 6 may be in an open state (corresponding to the non-degraded OTF, in which case the throughput of imaging system is M times a resolving ability of a sensor), and at least two semi-open states (corresponding to the degraded OTF, in which case the throughput of imaging system is equal to a resolving ability of a sensor).

Multiple images, generally k images, are captured, three such images in this specific example: first image with the OTF degraded to the sensor resolution (using partially-closed shutter), second image with OTF degraded to 3 times sensor resolution (using partially-closed shutter), and the third image using non-degraded OTF (using open shutter). Final images are created using post-processing. It should be understood that generally, the following images are to be captured: an image acquired with the filter's 11 cut-off corresponding to the optical cut off in the peripheral part of the field of view to thereby produce a zoomed-out image; an image acquired with the filter's 11 cut off corresponding to the optical cut off in the central part of the field of view to thereby produce an image captured all possible information, and image(s) acquired with the filter's 11 cut off corresponding to the frequency limit(s) (boundary/ies) between the mutually non-orthogonally coded adjacent Nyquist bands.

Returning back to this specific example of three images, using the first image the sensor scale resolution is recovered. After that, using the second image, high resolution information of up to 3 times higher than sensor resolution is reconstructed. This is done by preventing frequencies of the second aliasing Nyquist band from being detected. Thereafter, using the third image, high resolution information of up to 5 times higher than the sensor resolution is reconstructed.

The super-resolved image is restored on ⅓ field of view. The regular resolution image is obtained on the full field of view. The method enables obtaining resolution exciding sensor resolution by any odd factor greater than 3. For non-natural factors, the closest integer factor is used. The filter 11 is used to obtain any factor. For M=5 three frames are to be acquired, for M=7-more than four frames, for M=9-more than five frames, etc.

During the first image acquisition, the imaging system does not pass the high resolution information ($S_{-1}(v)$ and $S_1(v)$) as well as ($S_{-2}(v)$ and $S_2(v)$) in both the central $L_C \times L_C$ and peripheral part of the filed of view. Low resolution information $S_0(v)$ exists in the whole field of view L×L; $S_0(v)$ includes two parts: $S_0(v)=S_0^c(v)+S_0^p(v)$, where $S_0^c(v)$ is due to the central region $L_C \times L_C$ and $S_0^p(v)$ is due to the periphery region. The Fourier content is divided into M (5) equal regions (see FIG. 27):

k) Most left part $S_{-2}(v)$ with $v \in [-v_{max}, -(0.5+1)v_{N_y}^{sensor}]$
l) Left part $S_{-1}(v)$ with $v \in [-(0.5+1)v_{N_y}^{sensor}, -0.5v_{N_y}^{sensor}]$
m) Central part $S_0(v)$ with $v \in [-0.5v_{N_y}^{sensor}, 0.5v_{N_y}^{sensor}]$
n) Right part $S_1(v)$ with $v \in [0.5v_{N_y}^{sensor}, (0.5+1)v_{N_y}^{sensor}]$.
o) Most right part $S_2(v)$ with $v \in [(0.5+1)v_{N_y}^{sensor}, v_{max}]$.

The partially orthogonal filter 11 multiplies these spectral components so that orthogonality between the components is created. This filter 11 also consists of M (5) regions:

k) Most left part $G_{-2}(v)$ with $v \in [-v_{max}, -(0.5+1)v_{N_y}^{sensor}]$
l) Left part $G_{-1}(v)$ with $v \in [-(0.5+1)v_{N_y}^{sensor}, -0.5v_{N_y}^{sensor}]$
m) Central part $G_0(v)$ with $v \in [-0.5v_{N_y}^{sensor}, 0.5v_{N_y}^{sensor}]$
n) Right part $G_1(v)$ with $v \in [0.5v_{N_y}^{sensor}, (0.5+1)v_{N_y}^{sensor}]$.
o) Most right part $G_2(v)$ with $v \in [(0.5+1)v_{N_y}^{sensor}, v_{max}]$.

Figure 35:
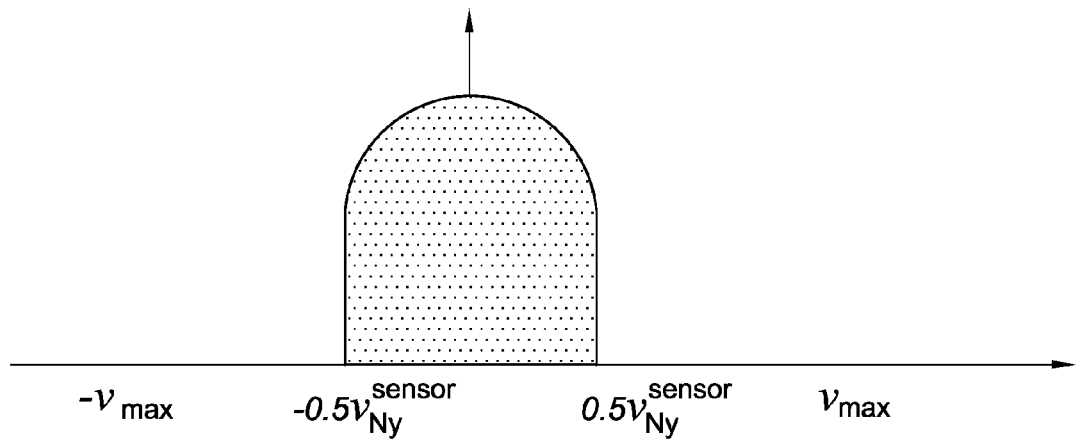
FIGS. 35 and 36 show a change of the OTF degradation due to the effect of the spatial frequency filter.

The imaging system has an OTF degraded to the sensor resolution (FIG. 35). Thus, high-resolution information content ($S_1(v)$ and $S_{-1}(v)$) as well as ($S_{-2}(v)$ and $S_2(v)$) are blocked.

Keeping in mind that this example uses the same code for the central Nyquist band, the spectrum of an object captured by CCD/CMOS sensor $I_0(v)$ can be reconstructed.

Figure 36:
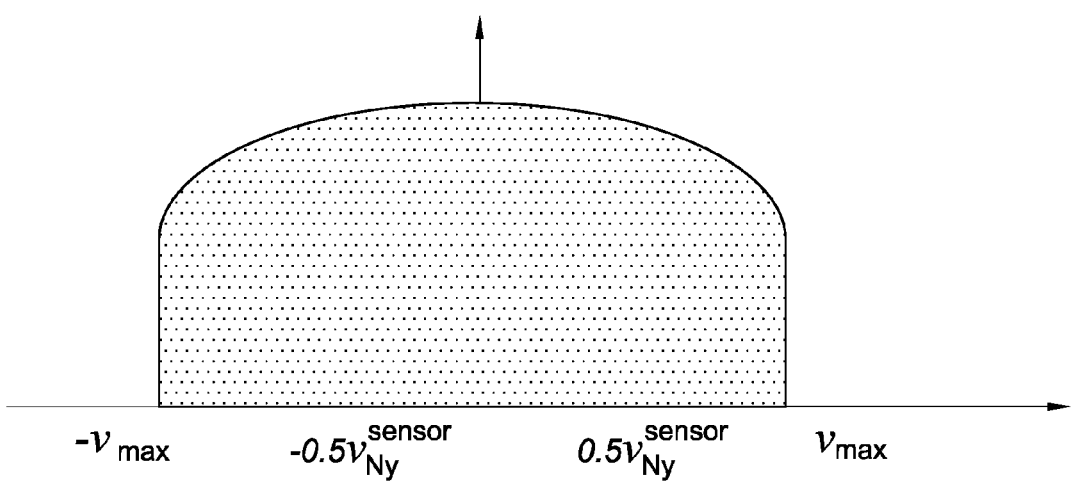
Figure 37:
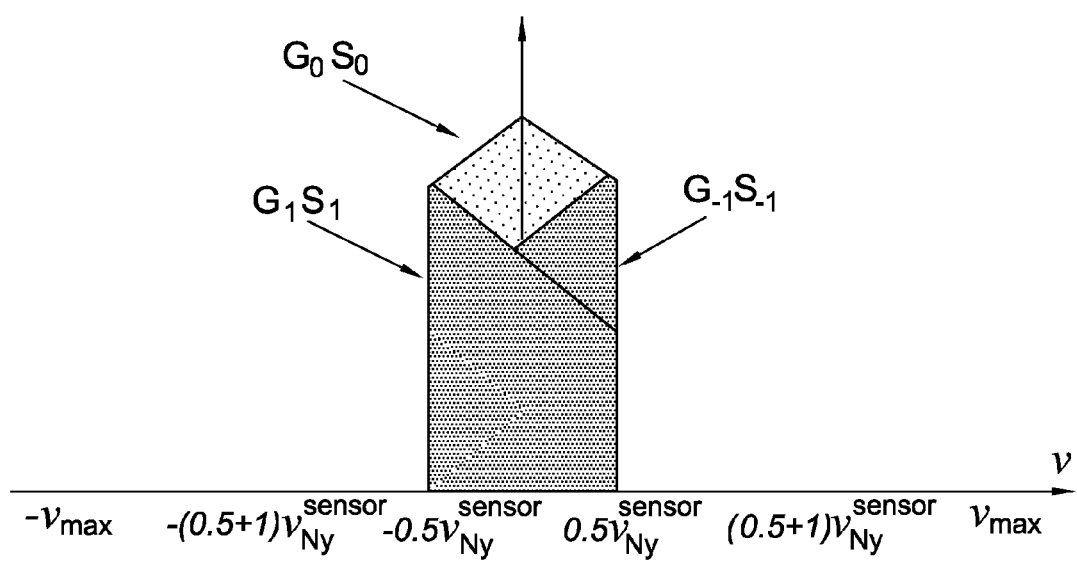
FIG. 37 illustrates aliasing of an aliasing Nyquist band into the central Nyquist band.

After processing the first image and obtaining $S_0(v)$, it is necessary to reconstruct a high-resolution information $S_1(v)$ and $S_{-1}(v)$. FIG. 36 shows the OTF for the second image, the OTF being degraded to 3 times sensor resolution. The captured image will thus undergo aliasing. Due to degraded OTF, $S_2(v)$ and $S_{-2}(v)$ are cut-off. The spectrum of an object captured by CCD/CMOS sensor is shown in FIG. 37 and is denoted by $I(v)$:

$$I(v) = \sum_{k=-1}^{1} S_k(v) \times G_k(v) \quad v \in [-0.5\ v_{Ny}^{sensor}, 0.5\ v_{Ny}^{sensor}] \tag{25}$$

When the image is under-sampled by the detector, an aliasing effect takes place; the aliasing is a folding of $S_{-1}(v)$ and $S_1(v)$ into a central spectral part. Therefore, the spectrum of the captured image equals to:

$$I(v) = \sum_{k=-1}^{1} S_k(v) \times G_k(v) \quad v \in [-0.5\ v_{Ny}^{sensor}, 0.5\ v_{max}^{sensor}] \tag{26}$$

$I_1(v)$ is determined as:

$$I_1(v) = \sum_{\substack{k=-1 \\ k \neq 0}}^{1} S_k(v) \times G_k(v) \tag{27}$$

The partially orthogonal filter 11 fulfils the orthogonality condition of:

$$G_l(v) \cdot G_k(v) = \delta[l,k] l, k \in [-1,1] \tag{28}$$

where $\delta[l,k]$ is Kronicker delta function.

Figure 38:
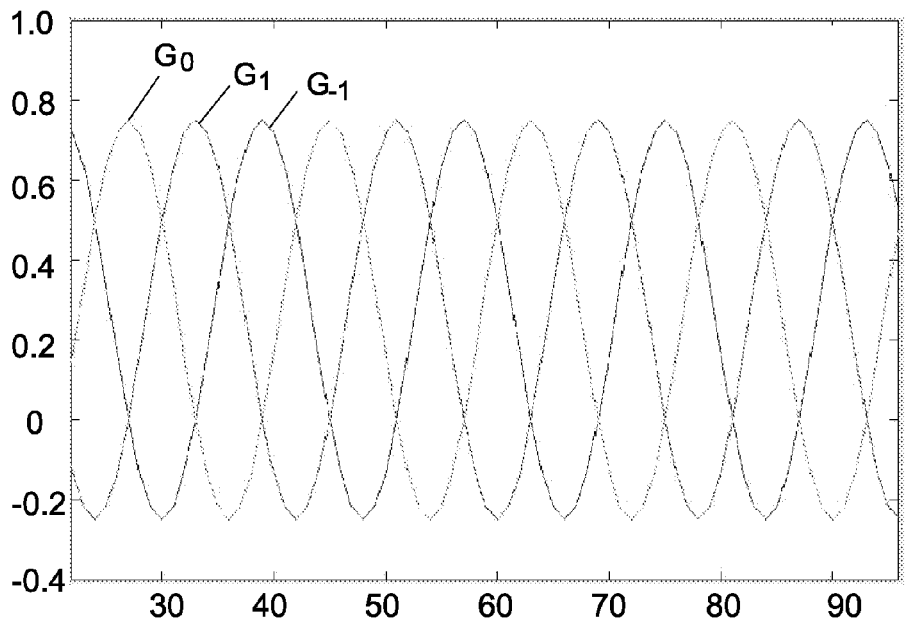
FIG. 38 shows an orthogonal spatial filter (grating) in the folded manner.

The partially orthogonal filter 11 is exemplified in FIG. 38 in the folded manner: $G_{-1}(v)$ and $G_1(v)$ are folded into a central third part $G_0(v)$.

Figure 39A:
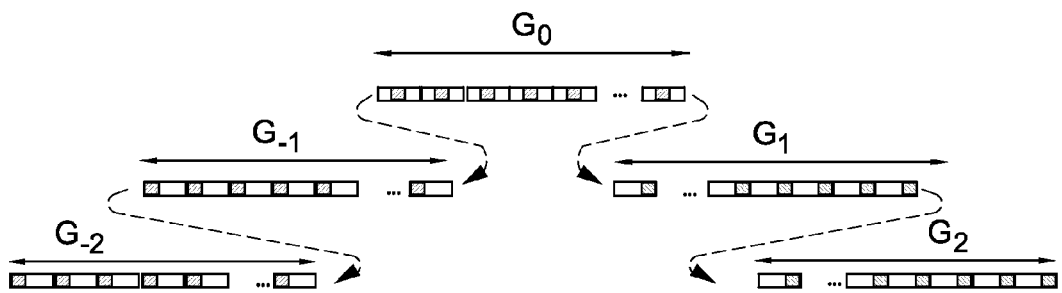
FIGS. 39A-39C show, respectively, an example of partially orthogonal coding, a code involved at a certain state of low spatial frequency filter, and an example of macro-pixels obtained by imaging with such code and subtraction of the central Nyquist band pixels, and FIG. 40 exemplifies a non-degraded OTF used for the image acquisition with the full field of view.
Figure 39B:
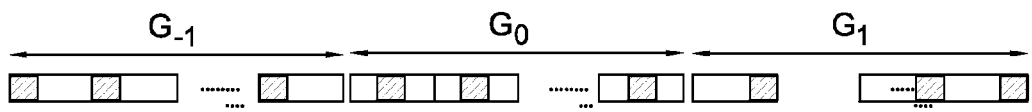
Figure 39C:
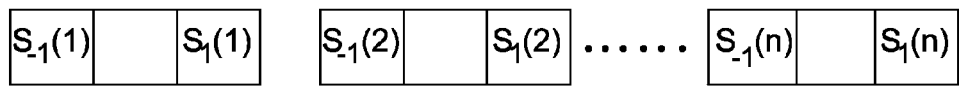

I(v) can be described as composed of "macro-pixels". Each macro-pixel consists of the contributions of: $S_{-1}(v)$, $S_1(v)$ and $S_0(v)$ for one type, and $S_{-2}(v)$, $S_2(v)$ and $S_0(v)$ for another—see FIG. 39A-39C showing the coding mask 11 (FIG. 39A), and that due to degraded OTF, $G_{-2}(v)$ and $G_2(v)$ are not relevant, and that in each spectral region there is a macro-pixel with a certain non-zero pixel (FIG. 39B), that after aliasing all non-zero pixel are folded in a non-overlapping way, providing orthogonality.

The high-resolution information is limited by the optical system to ⅓ of field of view. Therefore it is possible to reconstruct $S_{-1}(v)$ and $S_1(v)$, by taking $I_1(v)$ every 3rd sample and 3-times interpolation. The intermediate image having 3-times better (than sensor resolution) resolution image $S_{super3}(v)$ can be now found as:

$$S_{super3}(v) = S^c_0(v) + S_{-1}(v) + S_1(v) \tag{29}$$

After processing the first and second images and obtaining $S_0(v)$, $S_1(v)$ and $S_{-1}(v)$, it is necessary to reconstruct a high-resolution information $S_2(v)$ and $S_{-2}(v)$.

Figure 40:
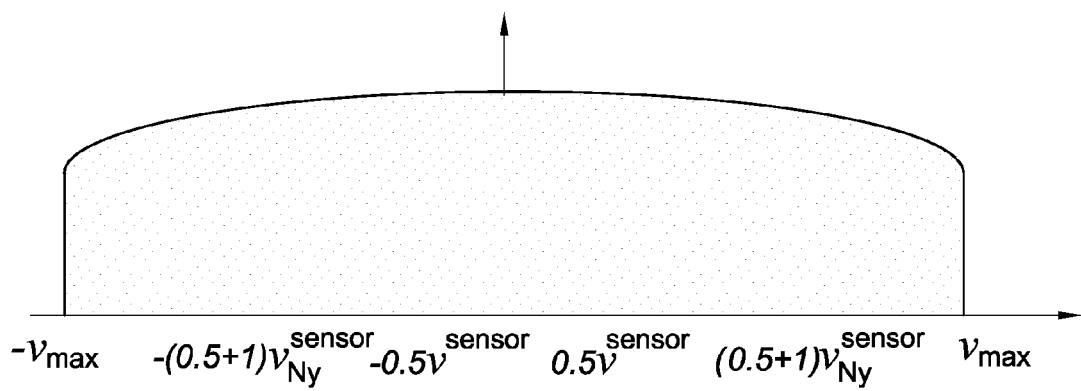
Figure 41:
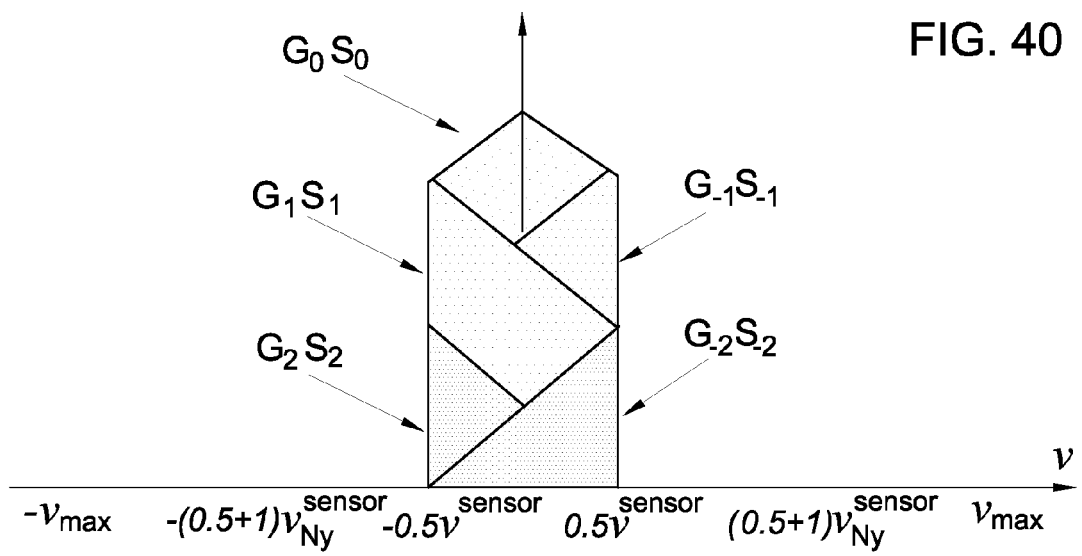
FIG. 41 shows aliasing of the spectrum of FIG. 40.

The non-degraded OTF for the second image is illustrated in the FIG. 40. The captured image will undergo aliasing. The spectrum of an object captured by CCD/CMOS sensor is shown in FIG. 41 and is denoted by I(v):

$$I(v) = \sum_{k=-2}^{2} S_k(v) \times G_k(v) \quad v \in [-0.5\, v_{Ny}^{sensor}, 0.5\, v_{Ny}^{sensor}] \tag{30}$$

When the image is under-sampled by the detector, aliasing effect takes place, being a folding of $S_{-2}(v)$, $S_{-1}(v)$, $S_1(v)$ and $S_2(v)$ into the central spectral part. Therefore, the spectrum of the captured image equals to:

$$I(v) = \sum_{k=-2}^{2} S_k(v) \times G_k(v) \quad v \in [-0.5\, v_{Ny}^{sensor}, 0.5\, v_{max}^{sensor}] \tag{31}$$

As $S_0(v)$, $S_1(v)$ and $S_{-1}(v)$ are recovered from the first and second images, we now can separate the folded $S_2(v)$ and $S_{-2}(v)$ high resolution information. $I_2(v)$ is determined as:

$$I_2(v) = \sum_{\substack{k=-2 \\ k \ne 0}}^{2} S_k(v) \times G_k(v) \tag{32}$$

Since $I_1(v)$ is known, we can write:

$$I_2(v) = I(v) - I_1(v) - S_0(v)G_0(v) \tag{33}$$

$$= \sum_{k=-2}^{2} S_k(v) \times G_k(v) - \sum_{\substack{k=-1 \\ k \ne 0}}^{1} S_k(v) \times G_k(v) - S_0(v)G_0(v)$$

$$= \sum_{\substack{k=-2 \\ k \ne 0, \pm 1}}^{2} S_k(v) \times G_k(v)$$

The partially orthogonal filter 11 fulfils the orthogonality condition of:

$$G_l(v) \cdot G_k(v) = \delta[l,k]l, k \in [-1,1] \tag{34}$$

where $\delta[l,k]$ is Kronicker delta function.

Figure 42A:
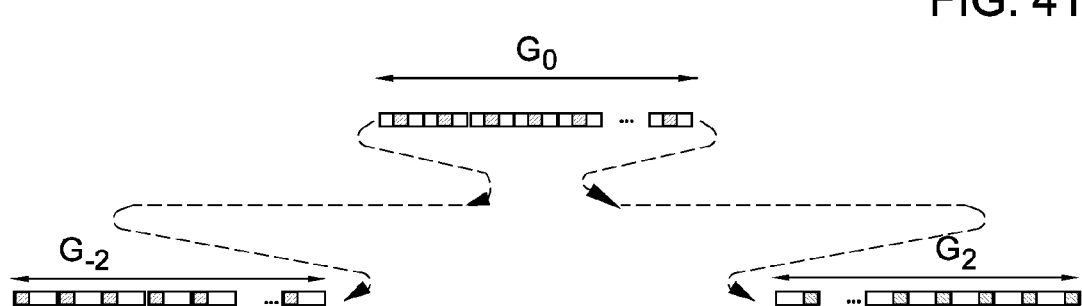
FIGS. 42A-42B show yet another example of the system operation with a partially orthogonal filter.
Figure 42B:
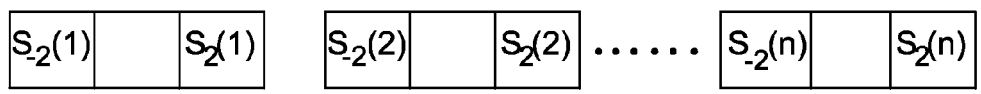

The partially orthogonal filter 11 can be configured and operate as illustrated in FIG. 42A in the folded manner: $G_{-2}(v)$ and $G_2(v)$ are folded into the central third part $G_0(v)$. As shown in FIG. 42B, in each spectral region there is a macro-pixel with a certain non-zero pixel, each consists of the contributions of $S_{-2}(v)$, $S_2(v)$, as $S_0(v)$, $S_1(v)$ and $S_{-1}(v)$ have already been subtracted. Filter 11 is partially orthogonal since the first aliasing Nyquist band and the second aliasing Nyquist band are mapped (fold) into the same regions of the central Nyquist band.

The final image, having 5-times better (than sensor resolution) resolution image in the ⅓ field of view is $S_{super5}(v)$, can be now found as:

$$S_{super5}(v) = S_0^C(v) + \sum_{\substack{k=-2 \\ k \ne 0}}^{2} S_k(v) \tag{35}$$

The full field of view $S_{no-super}(v)$ is simply $S_0(v)$.

Thus, the present invention provides methods and systems for achieving imaging a fraction of an object with a required zooming factor of the total field of view and the full field of view simultaneously, without requiring an axial movement of the optical elements of the system.

While this invention has been particularly shown and described with references to preferred embodiments thereof, it will be understood by those skilled in the art that various changes in form and details may be made therein without departing from the scope of the invention encompassed by the appended claims.

What is claimed is:

1. An imaging system for use in imaging with zoom, the system comprising a pixel detector array (PDA), an optical focusing arrangement, and a spatial filter configured and operable to selectively switch between at least two transmitting states, distributions of an optical resolution of the optical focusing arrangement and of a geometrical resolution of the PDA defining an aliasing window along an at least one direction.

2. The imaging system of claim 1, wherein said spatial filter is a filter of spatial frequencies.

3. The imaging system of claim 1, wherein said spatial filter is a filter of low spatial frequencies.

4. The imaging system of claim 1, wherein said spatial filter is a filter of space.

5. The imaging system of claim 1, wherein said spatial filter is a diaphragm.

6. The imaging system of claim 1, wherein said spatial filter is accommodated in a spectral plane of the system.

7. The imaging system of claim 1, wherein said spatial filter is accommodated in an intermediate image plane of the system.

8. The imaging system of claim 6, wherein said spatial filter is a filter of low spatial frequencies.

9. The imaging system of claim 6, wherein said spatial filter is a filter of space.

10. The imaging system of claim 1, comprising a partially orthogonal spatial frequency (POSF) filter.

11. The imaging system of claim 1, comprising an orthogonal spatial frequency (OSF) filter.

12. The imaging system of claim 3, comprising an orthogonal spatial frequency (OSF) filter.

13. The imaging system of claim 4, comprising an orthogonal spatial frequency (OSF) filter.

14. The imaging system of claim 8, comprising an orthogonal spatial frequency (OSF) filter.

15. The imaging system of claim 9, comprising an orthogonal spatial frequency (OSF) filter.

16. The imaging system of claim 3, comprising a partially orthogonal spatial frequency (POSF) filter.

17. The imaging system of claim 6, comprising a partially orthogonal spatial frequency (POSF) filter.

18. The imaging system of claim 10, wherein said POSF is located in a spectral plane of the system.

19. The imaging system of claim 11, wherein said OSF is located in a spectral plane of the system.

20. The imaging system of claim 1, comprising a processing unit connected to output of the PDA and configured and operable for to sample a spatial spectrum of a coded image of an object scene for aliased spatial frequencies and to unfold the sampled aliased spectrum into upper Nyquist bands, the sampling and unfolding being based on a respective to the coded image partially orthogonal code and a non-aliased zoomed-out image of the object scene, thereby generating a zoomed-in image of the object scene.

21. The imaging system of claim 1, comprising a processing unit connected to output of the PDA and configured and operable to sample a spatial spectrum of a coded image of a part of an object scene for aliased spatial frequencies and to unfold the sampled aliased spectrum into upper Nyquist bands, the sampling and unfolding being based on a respective to the coded image orthogonal code, and configured to sample a spatial spectrum of a coded image of the object scene for spatial frequencies of the part's complement, thereby generating a zoomed-in and a zoomed-out image of the object scene.

22. The imaging system of claim 1, comprising a processing unit connected to output of the PDA and configured and operable to sample a spatial spectrum of a coded image of a part of an object scene for aliased spatial frequencies and to unfold the sampled aliased spectrum into upper Nyquist bands, the sampling and unfolding being based on a respective to the coded image partially orthogonal code, and configured to sample a spatial spectrum of a coded image of the object scene for spatial frequencies of the part's complement, thereby generating a zoomed-in and a zoomed-out image of the object scene.

23. A partially orthogonal spatial frequency (POSF) filter comprising a grating having a selected spatial frequency transmission profile, a cut-off frequency of said profile, and at least one blocking frequency smaller than a half of the cut-off frequency within said profile, said blocking frequency being capable of being used as a Nyquist frequency in imaging with zoom, the blocking frequency defining a Nyquist band structure of said transmission profile, the structure having each positive and a symmetrical to it negative aliasing band folding in non-overlapping way into a central Nyquist band, and the profile having at least one transmitting spatial frequency folding into the central Nyquist band and therein mixing with a transmitting frequency from a any Nyquist band.

24. A kit for use in imaging with zoom, the kit comprising a pixel detector array (PDA) and a spatial frequency filter having a distribution of spatial frequency transmitting and blocking regions selected to partially orthogonally code spatial frequencies with respect to Nyquist bands of said PDA.

25. A kit for use in imaging with zoom, the kit comprising a pixel detector array (PDA), a spatial frequency filter having a distribution of spatial frequency transmitting and blocking regions selected to orthogonally code spatial frequencies with respect to Nyquist bands of said PDA, and a spatial filter configured and operable to selectively switch between at least two transmitting states.

26. A kit for use in imaging with coding, the kit comprising a pixel detector array (PDA) and a spatial frequency filter having a distribution of spatial frequency transmitting regions, each of the regions interrupting within 10% of a PDA spectral pixel pitch from a PDA spectral pixel.

27. A processing unit for use in imaging with zoom, the processing unit configured to sample a spatial spectrum of a coded image of an object scene for aliased spatial frequencies and to unfold the sampled aliased spectrum into upper Nyquist bands, the sampling and unfolding based on a respective to the coded image partially orthogonal code and a non-aliased zoomed-out image of the object scene, the unit thereby configured to generate a zoomed-in image of the object scene.

28. A processing unit for use in imaging with zoom, the processing unit configured to sample a spatial spectrum of a coded image of a part of an object scene for aliased spatial frequencies and to unfold the sampled aliased spectrum into upper Nyquist bands, the sampling and unfolding based on a respective to the coded image orthogonal code, and configured to sample a spatial spectrum of a coded image of the object scene for spatial frequencies of the part's complement, the unit thereby configured to generate a zoomed-in and a zoomed-out image of the object scene.

29. A processing unit for use in imaging with zoom, the processing unit configured to sample a spatial spectrum of a coded image of a part of an object scene for aliased spatial frequencies and to unfold the sampled aliased spectrum into upper Nyquist bands, the sampling and unfolding being based on a respective to the coded image partially orthogonal code, and configured to sample a spatial spectrum of a coded image of the object scene for spatial frequencies of the part's complement, thereby generating a zoomed-in and a zoomed-out image of the object scene.

30. A method of imaging, the method comprising imaging an object scene by an imaging system comprising a pixel detector array (PDA), an optical focusing arrangement, and a spatial filter configured and operable to selectively switch between at least two transmitting states, distributions of an optical resolution of the optical focusing arrangement and of a geometrical resolution of the PDA defining an aliasing window along an at least one direction.

31. The method of claim 30, wherein said spatial filter is a filter of spatial frequencies.

32. The method of claim 30, wherein said spatial filter is a filter of space.

33. The method of claim 30, wherein said filter is a diaphragm.

34. The method of claim 30, comprising switching said filter between said states.

35. A method of imaging with a pixel detector array (PDA), the method comprising partially orthogonally coding incoming light with respect to Nyquist bands of said PDA.

36. A method of imaging with a pixel detector array (PDA), the method comprising orthogonally coding incoming light with respect to Nyquist bands of said PDA, and switching a spatial filter configured and operable to selectively switch between at least two transmitting states.

* * * * *